US012228066B2

(12) United States Patent
Hirao et al.

(10) Patent No.: US 12,228,066 B2
(45) Date of Patent: Feb. 18, 2025

(54) ENGINE

(71) Applicant: Yanmar Holdings Co., Ltd., Osaka (JP)

(72) Inventors: Yu Hirao, Osaka (JP); Shinya Matsuo, Osaka (JP)

(73) Assignee: YANMAR HOLDINGS CO., LTD., Osaka (JP)

( * ) Notice: Subject to any disclaimer, the term of this patent is extended or adjusted under 35 U.S.C. 154(b) by 65 days.

(21) Appl. No.: 18/119,579

(22) Filed: Mar. 9, 2023

(65) Prior Publication Data

US 2023/0287826 A1 Sep. 14, 2023

(30) Foreign Application Priority Data

Mar. 10, 2022 (JP) ................................ 2022-036971
Mar. 10, 2022 (JP) ................................ 2022-036980
Mar. 10, 2022 (JP) ................................ 2022-036982

(51) Int. Cl.
*F01P 3/20* (2006.01)
*F01M 5/00* (2006.01)
(Continued)

(52) U.S. Cl.
CPC ............... *F01P 3/20* (2013.01); *F01M 5/002* (2013.01); *F01N 13/10* (2013.01); *F01P 3/02* (2013.01);
(Continued)

(58) Field of Classification Search
CPC ........ F01P 3/20; F01P 3/02; F01P 5/10; F01P 7/16; F01P 11/08; F01P 3/12;
(Continued)

(56) References Cited

U.S. PATENT DOCUMENTS 5,718,196 A * 2/1998 Uchiyama ............... F01L 1/265 123/196 R
7,264,520 B1 * 9/2007 Taylor ...................... F01P 11/08 440/88 HE
2021/0114451 A1 * 4/2021 Yamamoto ............ E02F 9/0891

FOREIGN PATENT DOCUMENTS

DE 3631340 A1 4/1987
GB 2548572 A 9/2017
(Continued)

OTHER PUBLICATIONS

European Search Report issued dated Jul. 25, 2023 issued in EP Application No. 23159659.4.

*Primary Examiner* — Syed O Hasan
(74) *Attorney, Agent, or Firm* — NORTON ROSE FULBRIGHT US LLP

(57) ABSTRACT

An engine includes: an engine block including a cylinder block and a head block, a cool liquid cooler that cools a first cool liquid that cools the engine block, a lubricant oil cooler that cools a lubricant oil using the first cool liquid or a second cool liquid, an exhaust manifold mounted to the engine block, a turbocharger driven by exhaust gas from the exhaust manifold, an exhaust communication pipe that communicates the exhaust manifold with the turbocharger, and a cool liquid flow channel through which a cool liquid discharged from the engine block flows in an order of the exhaust communication pipe and the exhaust manifold. The cool liquid cooler and the lubricant oil cooler are so placed as to be arranged side by side on one end side in a crankshaft direction.

14 Claims, 18 Drawing Sheets

(51) Int. Cl.

| | |
|---|---|
| ***F01N 13/10*** | (2010.01) |
| ***F01P 3/02*** | (2006.01) |
| ***F01P 5/10*** | (2006.01) |
| ***F01P 7/16*** | (2006.01) |
| ***F01P 11/08*** | (2006.01) |
| ***F02B 75/22*** | (2006.01) |
| *F01P 3/12* | (2006.01) |

(52) U.S. Cl.
CPC .................................... *F01P 5/10* (2013.01); *F01P 7/16* (2013.01); *F01P 11/08* (2013.01); *F02B 75/22* (2013.01); *F01P 2003/021* (2013.01); *F01P 3/12* (2013.01); *F01P 2060/04* (2013.01)

(58) Field of Classification Search
CPC ...................... F01P 2003/021; F01P 2060/04; F01M 5/002; F01N 13/10; F02B 75/22
See application file for complete search history.

(56) References Cited

FOREIGN PATENT DOCUMENTS

| | | | |
|---|---|---|---|
| JP | 2003-003848 | A | 1/2003 |
| JP | 2005-299393 | A | 10/2005 |
| JP | 2017-186954 | A | 10/2017 |
| WO | 2014127035 | A1 | 8/2014 |

* cited by examiner

ENGINE

CROSS-REFERENCE TO RELATED APPLICATIONS

This application claims priority under 35 U.S.C. § 119 to JP Application No. 2022-036980 filed Mar. 10, 2022, JP Application No. 2022-036971 filed Mar. 10, 2022, and JP Application No. 2022-036982 filed Mar. 10, 2022, the entire contents of which are hereby incorporated by reference.

TECHNICAL FIELD

The present invention relates to an engine.

BACKGROUND ART

Patent Document 1 discloses a technology to suppress the overall height, overall length, and overall width of an engine, thereby to make the engine more compact. Further the engine provided with a turbocharger is also known. In the above engine, a cool system is provided so as to prevent an excessive temperature increase in the turbocharger. For example, Patent Document 2 discloses a configuration in which a cool water flow channel is provided in a turbine housing of a turbocharger. Patent Document 3 discloses a technology to make the cool system of an engine more compact. In Patent Document 3, a cool water pass unit that integrates a water pump that supplies cool water, a thermo-case that cases a thermostat, a gas-liquid separation chamber that separates air from the cool water, a cool water supply pass that supplies the cool water, which is returned from a radiator, via the thermo-case and the water pump to a water jacket, a cool water discharge pass that discharges the cool water, which passed through the water jacket, to the radiator, and a bypass that causes the cool water, which passed through the water jacket, to bypasses the radiator and to return to the thermo-case is so configured as to be collectively and detachably mounted to an engine body.

The turbocharger-provided engine disclosed in Patent Literature 1 is provided with a fresh water cooler that cools fresh water supplied into the engine, and a lubricant oil cooler that cools a lubricant oil. The fresh water cooler is placed on the opposite side of the engine output side in the cylinder head, and the lubricant oil cooler is placed directly below an exhaust manifold so that the longitudinal direction of the lubricant oil cooler is parallel to the longitudinal direction of the exhaust manifold. That is, the lubricant oil cooler is placed on the lateral side of the engine.

PRIOR ART DOCUMENT

Patent Document

Patent Document 1: Japanese Unexamined Patent Application Publication No. 2005-299393
Patent Document 2: Japanese Unexamined Patent Application Publication No. 2017-186954
Patent Document 3: Japanese Unexamined Patent Application Publication No. 2003-003848

SUMMARY OF INVENTION

Technical Problem

The configuration of Patent Document 1 is effective when the overall width of the engine is small relative to the overall length of the engine, as in the case of an in-line multi-cylinder engine, for example. However, since the lubricant oil cooler is placed on the lateral side of the engine, there is a concern that the application of the configuration of Patent Document 1 may result in an overly large overall width of the engine when the overall width of the engine is large relative to the overall length of the engine, as in the case of a V-type engine, for example.

Further, there are concerns that, in a configuration of providing the turbocharger with a cool water flow channel, the configuration of the turbocharger will become more complex, and the manufacturing cost will be higher, for example. It is desirable to create a technology that can suppress an excessive temperature increase of the turbocharger while making it possible to suppress the engine configuration from being complicated. Further, the engine provided with two cylinder rows, such as V-type engine, for example, tends to have more components included in the cool liquid flow channel. Due to this, it is deemed cost effective to configure the cool liquid flow channel with fewer additional engine components.

An object of the present invention is to provide a technology preferable for an engine having an overall width likely to be large relative to an overall length of the engine, to provide a new technology that can prevent a turbocharger, which is provided in the engine, from becoming excessively hot, or to provide a technology that, in the engine provided with two cylinder rows, can configure a cool liquid flow channel while suppressing the number of components from being increased.

Solution to Problem

An exemplary engine of the present invention includes: a cool liquid cooler that cools a first cool liquid that cools an engine block including a cylinder block and a head block; and a lubricant oil cooler that cools a lubricant oil using the first cool liquid or a second cool liquid. The cool liquid cooler and the lubricant oil cooler are so placed as to be arranged side by side on one end side in a crankshaft direction. Further, the exemplary engine is a liquid-cooled engine, including: the engine block including the cylinder block and the head block, an exhaust manifold mounted to the engine block, a turbocharger driven by exhaust gas from the exhaust manifold, an exhaust communication pipe that communicates the exhaust manifold with the turbocharger, and a cool liquid flow channel through which a cool liquid discharged from the engine block flows in an order of the exhaust communication pipe and the exhaust manifold. Further, the exemplary engine includes: two cylinder rows, a first cool liquid flow channel provided for one of the two cylinder rows, and a second cool liquid flow channel provided for another of the two cylinder rows, and a gear case in which a part of the first cool liquid flow channel and/or a part of the second cool liquid flow channel is provided.

Advantageous Effects of Invention

The present invention can provide a technology preferable for an engine having an overall width likely to be large relative to an overall length of the engine, can prevent a turbocharger, which is provided in the engine, from becoming excessively hot, or in the engine provided with two cylinder rows, can configure a cool liquid flow channel while suppressing the number of components from being increased.

DESCRIPTION OF EMBODIMENTS

Figure 1:
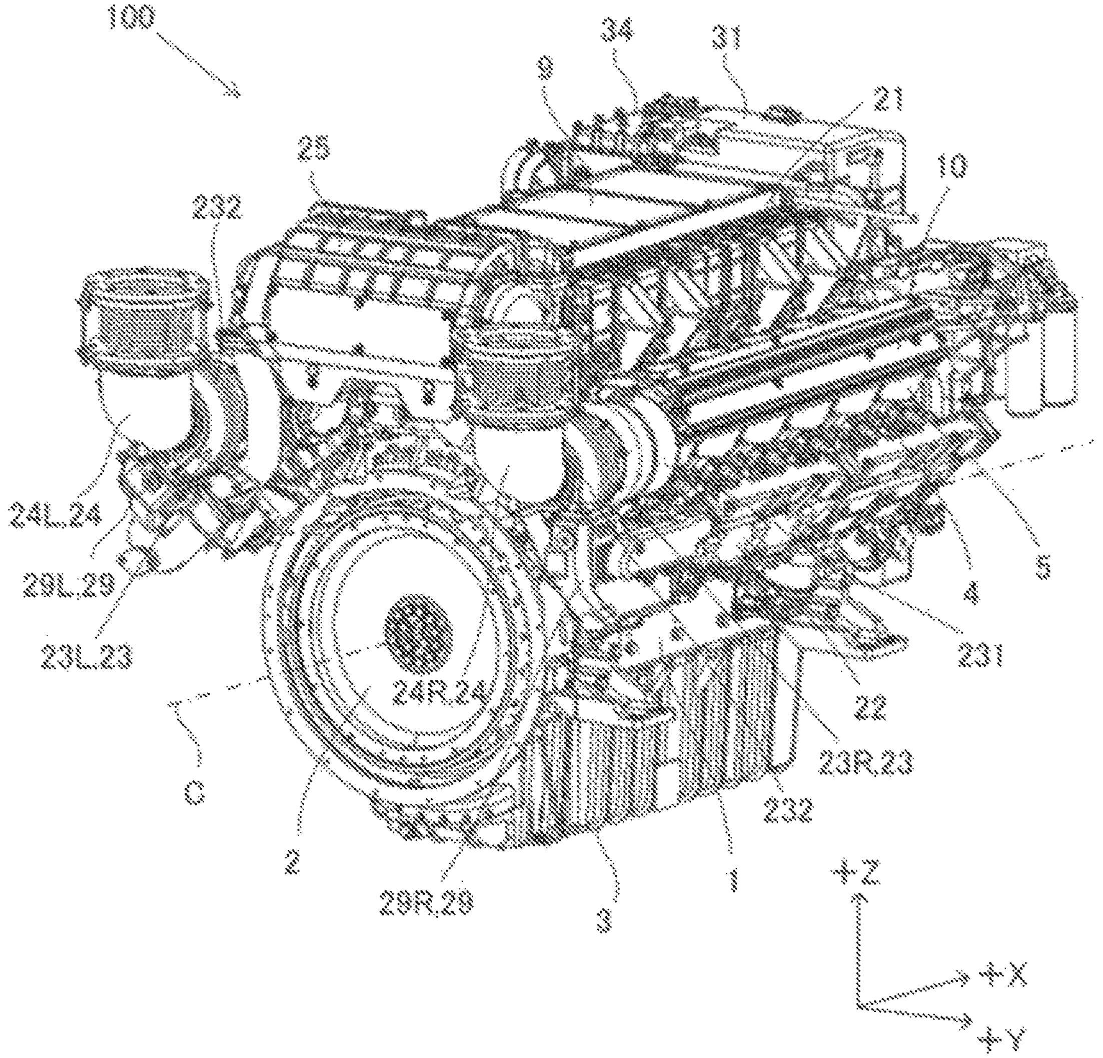
FIG. 1 is a schematic perspective view of a configuration of an engine.

The following is a detailed description of an exemplary embodiment of the present invention with reference to the drawings. In the drawings, XYZ coordinate system is shown as the 3D Cartesian coordinate system, as appropriate. In the following description, X direction is defined as a front and back direction, Y direction is defined as a right and left direction, and Z direction is defined as an up and down direction. +X side is defined as a front side, and −X side is defined as a back side. +Y side is defined as a right side, and −Y side is defined as a left side. +Z side is defined as an up side, and −Z side is defined as a down side. In detail, the direction in which a center line C of a crankshaft (output shaft) shown in FIG. 1 extends is defined as the front and back direction, and the side where a flywheel 2 is placed relative to a cylinder block 1 is defined as the back side. The up and down direction is defined with the side, where an oil pan 3 is placed relative to the cylinder block 1, as the down side. The direction orthogonal to the front and back and up and down directions is defined as the right and left direction, with the right side being the right side and the left side being the left side when viewed from the back toward the front. These directions are names merely used for an illustrative purpose, and are not intended to limit the actual positional relation and direction. In the present specification, the crankshaft direction is the same as the front and back direction in which the center line C of the crankshaft extends.

1. Overview of Engine

FIG. 1 is a schematic perspective view showing a configuration of an engine 100 according to an embodiment of the present invention. The engine 100 is preferable, for example, as a marine engine used for a ship. However, the engine 100 is not limited to the marine engine, and may be applied to any other application. The engine 100 is a diesel engine.

Figure 2:
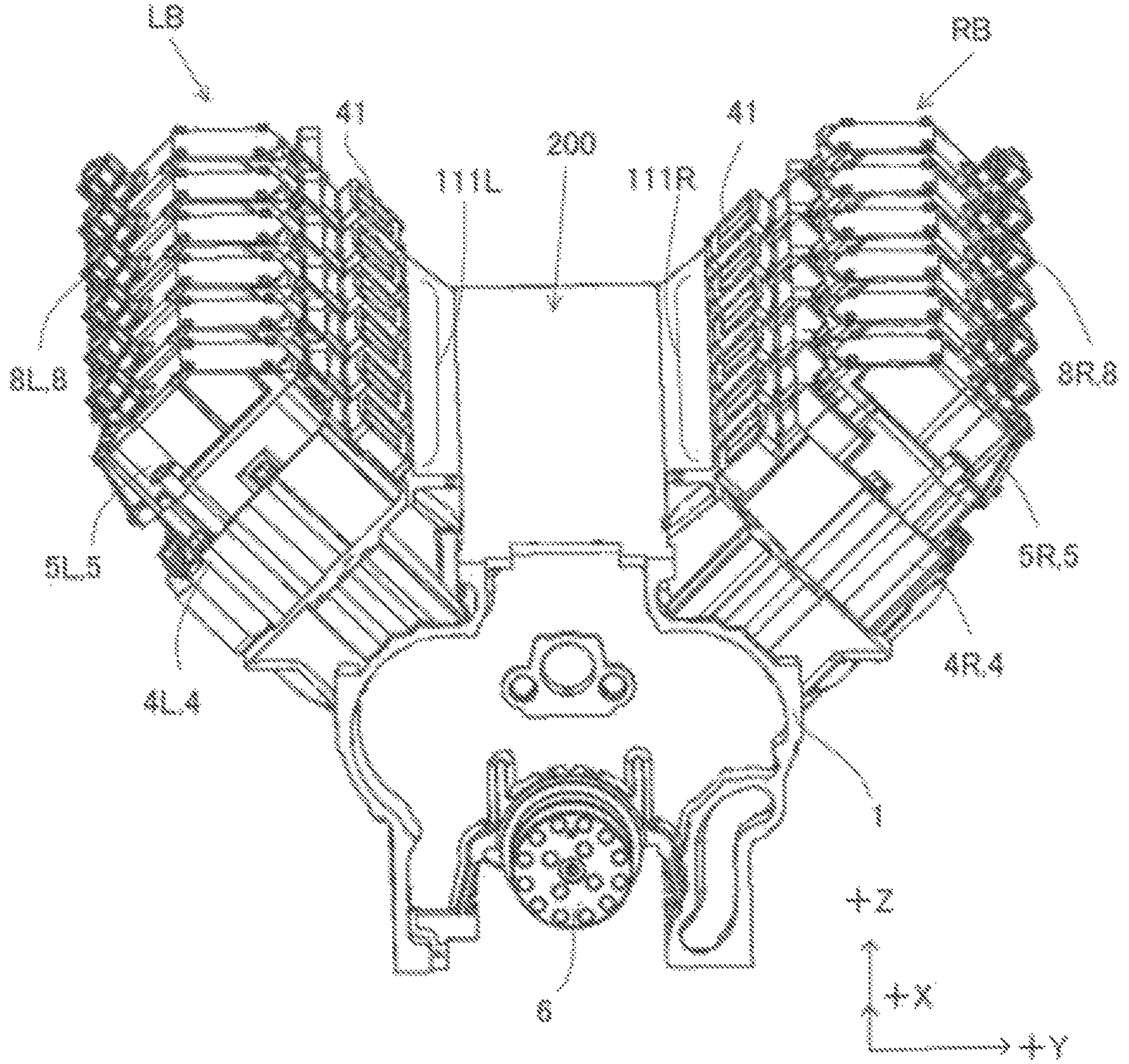
FIG. 2 is a schematic perspective view showing an extracted portion including a cylinder block, a head block, and a head cover which are provided in the engine.
Figure 3:
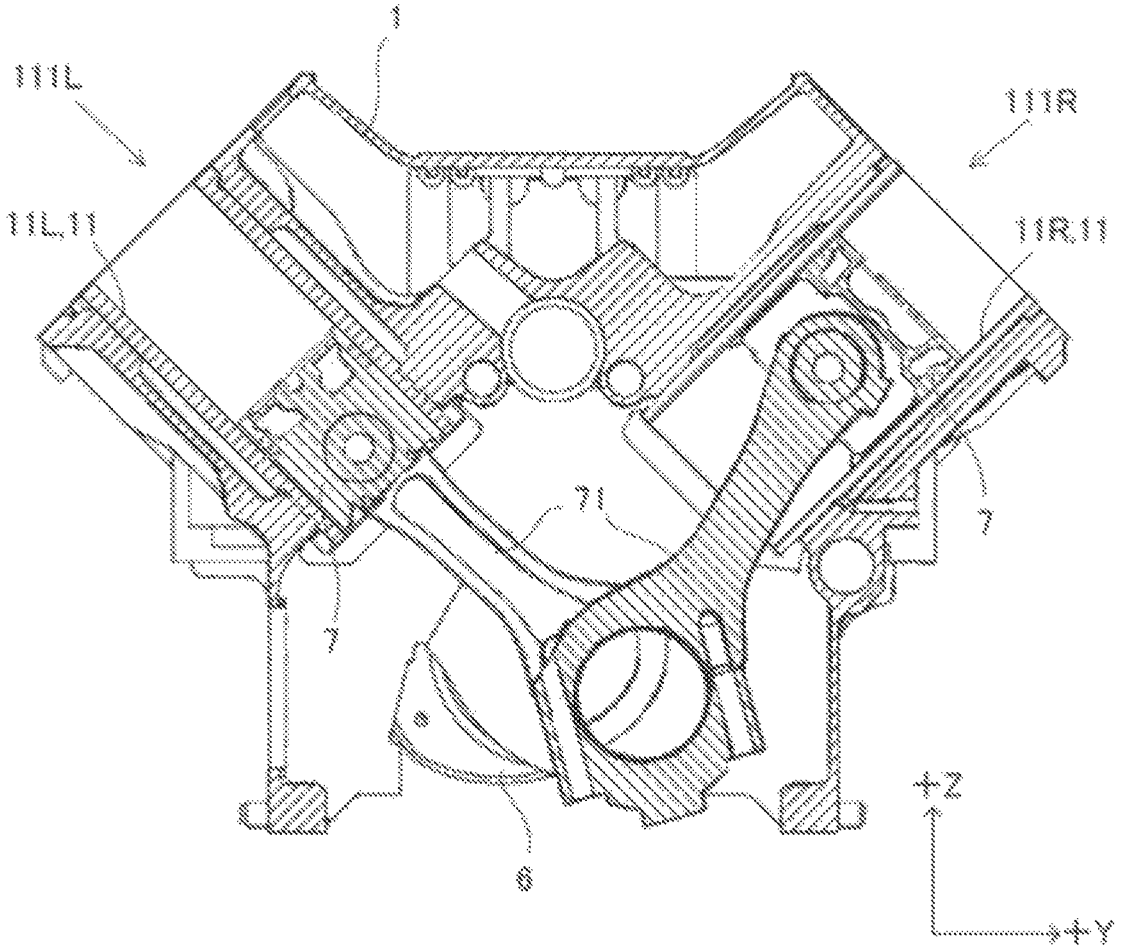
FIG. 3 is a schematic cross-sectional view of a cylinder block portion provided in the engine.

As shown in FIG. 1, the engine 100 includes a cylinder block 1, a head block 4, and a head cover 5. The cylinder block 1 and the head block 4 are included in the engine block (engine body). That is, the engine 100 is provided with an engine block. FIG. 2 is a schematic perspective view showing extracted a portion including the cylinder block 1, the head block 4, and the head cover 5 which are provided in the engine 100. FIG. 3 shows a schematic cross-sectional view of the cylinder block 1 portion of the engine 100.

As shown in FIGS. 2 and 3, a crankshaft 6, which extends in the front and back direction, and a piston 7 are placed inside the cylinder block 1. The inner portion of the cylinder block 1 connects to the inner portion of the oil pan 3 which is placed at the down side and stores a lubricant oil. A flywheel 2 (see FIG. 1) is mounted to the back end of the crankshaft 6. The flywheel 2 rotates integrally with the crankshaft 6, and is used to take out power from the engine 100. The piston 7, in detail, is placed in the cylinder 11 formed in the cylinder block 1. The piston 7 is connected to the crankshaft 6 via a connecting rod 71.

In detail, the cylinder block 1 has a right cylinder 11R placed on the right side and a left cylinder 11L placed on the left side. The right cylinder 11R, when viewed from behind, is of a cylindrical shape which is tilted to the right relative to the up and down direction and extends in an oblique direction. The left cylinder 11L, when viewed from behind, is of a cylindrical shape which is tilted to the left relative to the up and down direction and extends in an oblique direction. The right cylinder 11R and the left cylinder 11L are placed in a V-shape. The pairwise right cylinder 11R and left cylinder 11L which are placed in the V-shape are placed with their cylinder axes slightly offset in the front and back direction. In the present embodiment, the left cylinder 11L is placed slightly forward of the right cylinder 11R.

The cylinder block 1 has a right cylinder row 111R with the multiple right cylinders 11R arranged in the front and back direction, and a left cylinder row 111L with the multiple left cylinders 11L arranged in the front and back direction. That is, the engine 100 has two cylinder rows 111R and 111L. Each of the two cylinder rows 111R and 111L extends a row in the direction of the crankshaft. The two cylinder rows 111R and 111L are so placed as to be arranged with each other. Further, the two cylinder rows 111R and 111L are arranged in the right and left direction in detail. The right cylinder row 111R and the left cylinder row 111L form a V-shaped bank. In the present embodiment, the number of right cylinders 11R included in the right cylinder row 111R and the number of left cylinders 11L included in the left cylinder row 111L are each six, as an example. That is, the engine 100 in the present embodiment is a V-type 12-cylinder engine.

In each of the right and left cylinder rows 111R and 111L, the head block 4 is placed overlapping each cylinder 11. The head block 4 is fastened to the cylinder block 1 by using a screw. In detail, the head block 4 includes a right head block 4R that overlaps the right cylinder 11R and a left head block 4L that overlaps the left cylinder 11L. Because one right head block 4R overlaps each right cylinder 11R, there are as many right head blocks 4R as there are right cylinders 11R. Because one left head block 4L is overlaps each left cylinder 11L, there are as many left head blocks 4L as there are left cylinders 11L. In the present embodiment, the number of right head blocks 4R and the number of left head blocks 4L are each six.

Each of the head blocks 4 has an intake port 41 to supply gas to a combustion chamber including the cylinder 11, the piston 7, and the head block 4, and an exhaust port (not shown) to exhaust the gas from the combustion chamber. Further, the exhaust port is provided on the opposite face of the face where the intake port 41 is provided. In detail, the right head block 4R has the intake port 41 on the left lateral face and the exhaust port on the right lateral face. The left head block 4L has the intake port 41 on the right lateral face and the exhaust port on the left lateral face.

Each head block 4 is covered with the head cover 5. The head cover 5 is fastened to the head block 4 by using a screw. Each head cover 5 covers intake and exhaust valves (not shown) placed at the head block 4. An injector 8 is mounted on each head cover 5. The injector 8's one end portion, where an injection port for injecting a fuel is provided, faces the combustion chamber. The injector 8's another end portion projects outward from the head cover 5.

In detail, the head cover 5 includes a right head cover 5R that covers the right head block 4R and a left head cover 5L that covers the left head block 4L. The right head covers 5R, due to covering the respective right head blocks 4R, are the same in number as the right head blocks 4R. The left head covers 5L, due to covering the respective left head blocks 4L, are the same in number as the left head blocks 4L. In the present embodiment, the number of right head cover 5R and the number of left head cover 5L are each six. Also, the number of right injectors 8R placed at the right head cover 5R and the number of left injectors 8L placed at the left head cover 5L are each six.

On the right side of cylinder block 1, the right cylinder 11R, the right head block 4R and the right head cover 5R, which are included in a right bank RB, extend diagonally upward to the right. On the left side of cylinder block 1, the left cylinder 11L, the left head block 4L, and the left head cover 5L, which are included in a left bank LB, extend diagonally upward to the left. In plan view from the front and back direction, a combination of the right bank RB and the left bank LB is V-shaped, and the engine 100 has a V-bank. An intra-bank area 200 is formed between the right bank RB and the left bank LB in the right and left direction.

Returning to FIG. 1, the engine 100 has an upper face cover 9 and a lateral face cover 10. The upper face cover 9 suppresses water from splashing, due to condensation, for example, onto a controller 26 (see FIG. 4, etc., below) and the like placed inside. The lateral face cover 10 suppresses the fuel from splashing due to a crack, etc. in a component part such as the head block 4, for example. Although FIG. 1 shows only the lateral face cover 10 placed on the right lateral face, a similar lateral face cover 10 is also placed on the left lateral face. That is, the engine 100 is provided with a pair of right and left lateral face covers 10.

Figure 4:
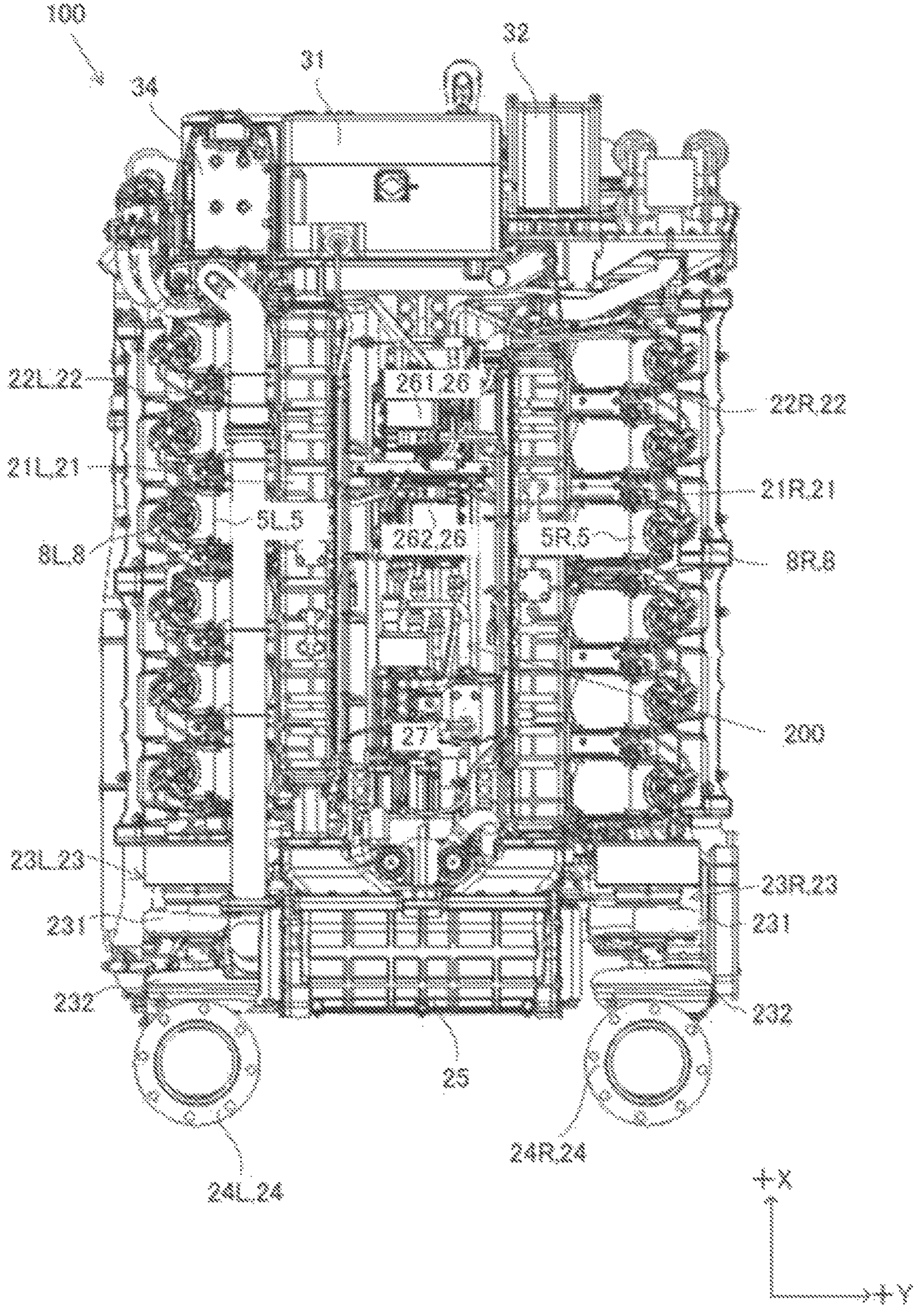
FIG. 4 is a schematic top view showing the configuration of the engine.

FIG. 4 is a schematic top view showing the configuration of the engine 100 according to the embodiment of the present invention. In FIG. 4, the upper face cover 9 and the pair of lateral face covers 10 are omitted. As shown in FIGS. 1 and 4, the engine 100 includes an intake manifold 21 and an exhaust manifold 22. The intake manifold 21 and the exhaust manifold 22 are mounted to the engine block (head block 4 in detail).

To each of the cylinders 11, the intake manifold 21 distributes intake air which is air or mixture air taken in from the outside. The intake manifold 21 is placed at an upper portion of the engine 100, and extends in the front and back direction. In detail, the intake manifold 21 includes a right intake manifold 21R for the right cylinder 11R, and a left intake manifold 21L for the left cylinder 11L. That is, the engine 100 has two intake manifolds 21R and 21L.

The right intake manifold 21R is placed above the respective intake ports 41 (see FIG. 2) of the multiple right head blocks 4R which are arranged in the front and back direction. The inner portion of the right intake manifold 21R and the respective right cylinders 11R are connected via the respective intake ports 41. The left intake manifold 21L is placed above the respective intake ports 41 of the multiple left head blocks 4L which are arranged in the front and back direction. The inner portion of the left intake manifold 21L and the respective left cylinders 11L are connected via the respective intake ports 41.

In detail, an intake valve (not shown) is interposed between each intake port 41 and each cylinder 11; when the intake valve is open, the inner portion of intake manifold 21 and cylinder 11 are communicated.

The exhaust manifold 22 collects the exhaust air from the respective cylinders 11. The exhaust manifold 22 is placed at the lateral face portion of the engine 100, and extends in the front and back direction. In detail, the exhaust manifold 22 includes a right exhaust manifold 22R for the right cylinder 11R, and a left exhaust manifold 22L for the left cylinder 11L.

The right exhaust manifold 22R is placed on the right side of the multiple right head blocks 4R (see FIG. 2) which are arranged in the front and back direction. The inner portion of the right exhaust manifold 22R and the respective right cylinders 11R are connected via exhaust ports (not shown) provided on the right side of the right head blocks 4R. The left exhaust manifold 22L is placed on the left side of the multiple left head blocks 4L (see FIG. 2) which are arranged in the front and back direction. The inner portion of the left exhaust manifold 22L and the respective left cylinders 11L are connected via the exhaust ports (not shown) provided on the left side of the left head blocks 4L.

In detail, an exhaust valve (not shown) is interposed between each exhaust port and each cylinder 11; when the exhaust valve is open, the inner portion of the exhaust manifold 22 and the cylinder 11 are communicated.

The exhaust gas collected at the right exhaust manifold 22R is exhausted to the outside via the right turbocharger 23R and the right exhaust outlet pipe 24R which are each placed at the right back of the engine 100. The exhaust gas collected at the left exhaust manifold 22L is exhausted to the outside via the left turbocharger 23L and the left exhaust outlet pipe 24L which are each placed at the left back of the engine 100.

The right turbocharger 23R and the left turbocharger 23L each have a compressor unit 231 and a turbine unit 232. The compressor unit 231 pressurizes and compresses intake air such as air supplied from outside the engine 100. The pressurized and compressed intake air is supplied via an intercooler 25 to the intake manifold 21. The turbine unit 232 is rotated by the exhaust gas supplied from the exhaust manifold 22. The rotary power of the turbine unit 232 is transmitted to the compressor unit 231. That is, the right turbocharger 23R and left turbocharger 23L in the present embodiment are so-called turbochargers that are driven by an exhaust gas turbine. The engine 100 is provided with a turbocharger 23 driven by the exhaust gas from the exhaust manifold 22.

The intercooler 25, which is connected with the intake manifold 21, is supplied with cool water by a cool water pump (not shown), thereby to cool the intake air. The intake air supplied from the compressor unit 231 is pressurized and compressed, thereby to generate a compression heat and to be increased in temperature. The intercooler 25 performs heat exchange between the cool water, which is supplied by the cool water pump, and the pressurized compressed intake air, thereby to cool the intake air. That is, providing the intercooler 25 allows the temperature of the intake air, which is supplied to the intake manifold 21, to be adjusted to a desired temperature.

As shown in FIG. 4, the right intake manifold 21R and the left intake manifold 21L are spaced apart and arranged in the right and left direction at the upper portion of the engine 100. As shown in FIG. 4, with the upper face cover 9 removed, the intra-bank area 200 is exposed to the outside via a space between the right intake manifold 21R and the left intake manifold 21L. In the intra-bank area 200, there are placed, for example, the controller 26 that controls the entire engine 100, and a fuel pump 27 that supplies the fuel to the injector 8.

That is, the engine 100 includes the controller 26 placed in the intra-bank area 200 positioned between the right and left cylinder rows 111R and 111L. Also, the engine 100 includes the fuel pump 27 placed in the intra-bank area 200. The intra-bank area 200 may be, in a strict sense, a space area between the right and left cylinder rows 111R and 111L. In the present embodiment, however, the intra-bank area 200 widely includes the space area in the right and left direction between the right bank RB which includes the right cylinder row 111R, and the left bank LB which includes the left cylinder row 111L.

Creating the configuration to place the controller 26 and the fuel pump 27 in the intra-bank area 200 can efficiently use the intra-bank area 200 for placing the component part. This makes it possible to downsize the engine 100. However, the controller 26 and the fuel pump 27 may be placed outside of the intra-bank area 200.

Further, the controller 26 includes, in detail, a first controller 261 and a second controller 262. However, the number of controllers 26 may be changed as needed; for example, the controller 26 may include only one controller. In the present embodiment, the first controller 261 and the second controller 262 are arranged in the front and back direction (crankshaft direction). In detail, the first controller 261 is placed forward of the second controller 262. Any one of the first controller 261 and the second controller 262 is a main controller and another thereof is a sub-controller. In the present embodiment, the first controller 261 is the main controller, and the second controller 262 is the sub-controller.

The first controller 261 configured as the main controller executes a calculation necessary to control the engine 100. The calculations required to control the engine 100 include, for example, a calculation related to the control of fuel injection and a calculation related to stopping the engine 100. The second controller 262 which is configured as the sub-controller is connected with the first controller 261 by a communication line (not shown), and is so provided as to be capable of communicating with the first controller 261. The second controller 262 executes a control operation according to an instruction from the first controller 261.

The first controller 261 controls the right injector 8R placed at the right bank RB. That is, the first controller 261 and each right injector 8R are electrically connected. Further, the second controller 262 controls the left injector 8L placed at the left bank LB. That is, the second controller 262 and each left injector 8L are electrically connected.

Further, the fuel pump 27 discharges the fuel, which is at a high pressure, toward a high pressure fuel pipe (not shown) for the right bank RB and a high pressure fuel pipe (not shown) for the left bank LB. The fuel passing through the high-pressure fuel pipe for the right bank RB is distributed to each of the right injectors 8R placed at the right bank RB. The fuel passing through the high-pressure fuel pipe for the left bank LB is distributed to each of the left injectors 8L placed at the left bank LB. Under control by the controller 26, each of the injectors 8 injects the fuel to the combustion chamber.

2. Cool System

The engine 100 in the present embodiment is a liquid-cooled engine. The engine 100 is provided with a cool liquid flow channel 50 (see FIG. 5 below) that flows a cool liquid which cools the cylinder block 1 included in the engine block and also cools each of the multiple head blocks 4 included in the engine block. The cool liquid in the present embodiment is cool water. However, the cool liquid may be a liquid other than water, such as antifreeze, for example. Antifreeze is, for example, a liquid mixture of pure water and ethylene glycol in a given ratio.

Figure 5:
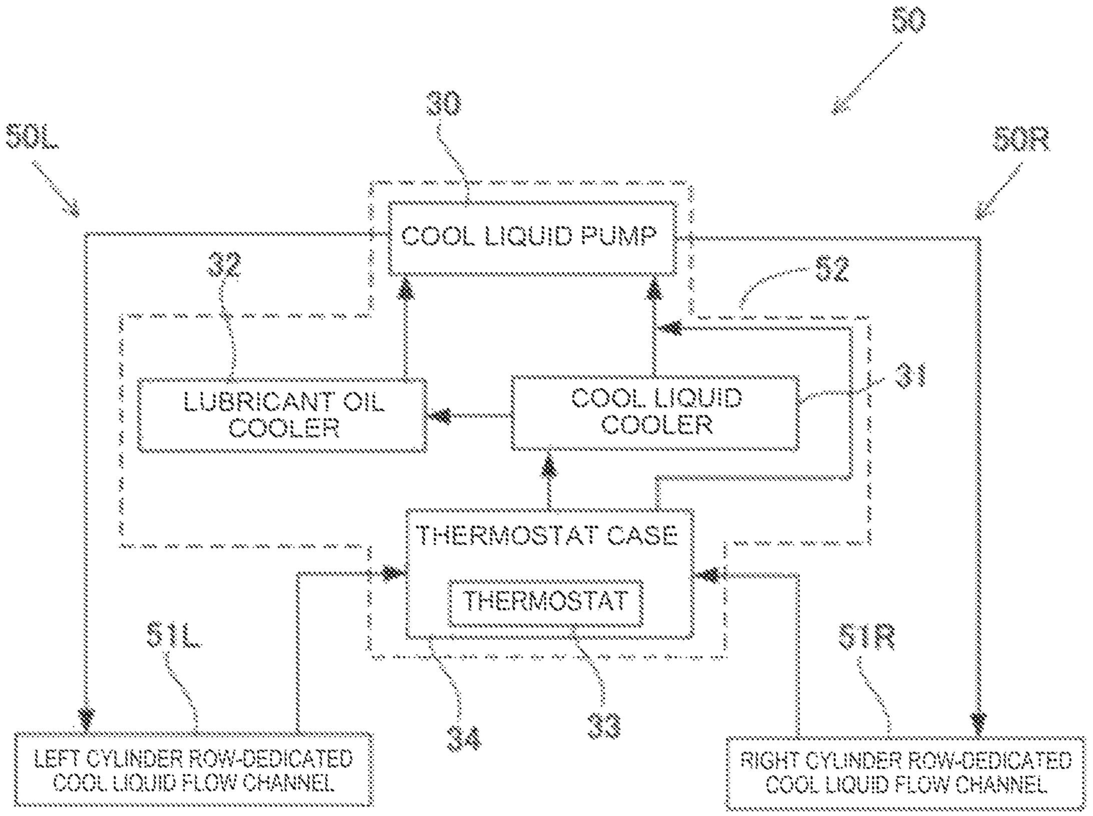
FIG. 5 is a diagram showing a schematic configuration of a cool liquid flow channel provided in the engine.

FIG. 5 is a diagram showing the schematic configuration of the cool liquid flow channel 50 provided in the engine 100 according to the embodiment of the present invention. In the present embodiment, the cool liquid flow channel 50 includes a first cool liquid flow channel 50R and a second cool liquid flow channel 50L. That is, the engine 100 is provided with the first cool liquid flow channel 50R and the second cool liquid flow channel 50L. The first cool liquid flow channel 50R is provided for one of the two cylinder rows 111R and 111L. The second cool liquid flow channel 50L is provided for the other of the two cylinder rows 111R and 111L. In detail, the first cool liquid flow channel 50R is a cool liquid flow channel provided for the right cylinder row 111R. The second cool liquid flow channel 50L is a cool liquid flow channel provided for the left cylinder row 111L.

The first cool liquid flow channel 50R includes a right cylinder row-dedicated cool liquid flow channel 51R and a shared cool liquid flow channel 52. The second cool liquid flow channel 50L includes a left cylinder row-dedicated cool liquid flow channel 51L and the shared cool liquid flow channel 52. The shared cool liquid flow channel 52 is a cool liquid flow channel shared by both the first cool liquid flow channel 50R and the second cool liquid flow channel 50L.

Figure 6:
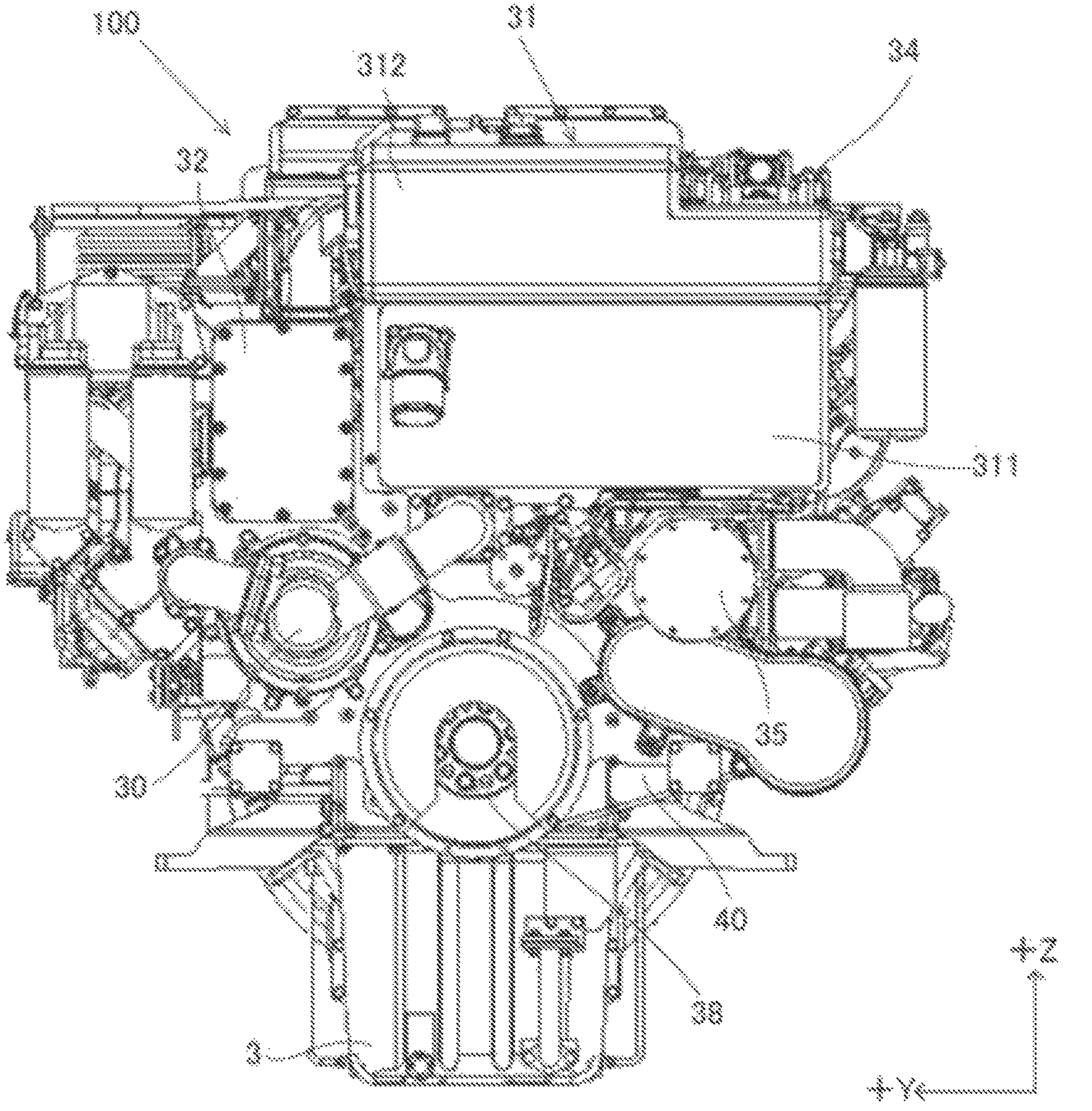
FIG. 6 is a schematic front view of the configuration of the engine.

As shown in FIG. 5, the shared cool liquid flow channel 52 includes a cool liquid pump 30, a cool liquid cooler 31, a lubricant oil cooler 32, and a thermostat case 34 that cases a thermostat 33. FIG. 6 is a schematic front view of the configuration of the engine 100 according to the embodiment of the present invention. FIG. 6 shows the engine 100 viewed from the front toward the back. As shown in FIG. 6, the cool liquid pump 30, the cool liquid cooler 31, the lubricant oil cooler 32, and the thermostat case 34 are placed at the front end portion of the engine 100.

The cool liquid pump 30 circulates the cool liquid in the cool liquid flow channel 50. The cool liquid pump 30 is driven by rotational power sent from the crankshaft 6 via a gear (not shown). In the present embodiment, the cool liquid pump 30 is a cool water pump.

The cool liquid cooler 31 cools the cool liquid circulating in the cool liquid flow channel 50. In the present embodiment, the cool liquid cooler 31 is a fresh water cooler. The cool liquid cooler 31, by using heat exchange with seawater pumped by drive of a seawater pump 35, cools the cool liquid circulating in the cool liquid flow channel 50. Further, the seawater pump 35 is placed in the front end portion of the engine 100. The seawater pump 35 is driven by rotational power sent from the crankshaft 6 via the gear (not shown). Further, in the present embodiment, the seawater pumped by the seawater pump 35 is sent to the intercooler 25 and then to the cool liquid cooler 31, to be discharged to the outside (sea). That is, the seawater pump 35 is an example of a cool water pump that supplies the cool water to the above intercooler 25.

The lubricant oil cooler 32 cools the lubricant oil. Driving the lubricant oil pump (not shown) supplies the lubricant oil from the oil pan 3 to each part of the engine 100, and returns the lubricant oil to the oil pan 3. The lubricant oil cooler 32 is included also in the lubricant oil flow channel. Using the cool liquid flowing in the cool liquid flow channel 50, the lubricant oil cooler 32 cools the lubricant oil. Further, the lubricant oil pump is driven by rotational power sent from the crankshaft 6 via the gear (not shown).

The thermostat case 34 covers the thermostat 33 placed at the cool liquid cooler 31, and is included in the cool liquid flow channel 50. The thermostat 33 has a function to keep the temperature of the cool liquid near a set temperature. The function of the thermostat 33 sends the cool liquid, which needs to be cooled, to the cool liquid cooler 31.

The cool liquid discharged from the cool liquid pump 30 is sent to the right cylinder row-dedicated cool liquid flow channel 51R and the left cylinder row-dedicated cool liquid flow channel 51L, respectively. The cool liquids that respectively pass through the right cylinder row-dedicated cool liquid flow channel 51R and the left cylinder row-dedicated cool liquid flow channel 51L are sent to the thermostat case 34 which cases the thermostat 33. In the cool liquids sent to the thermostat case 34, there is a cool liquid that is sent to the cool liquid cooler 31 by the action of the thermostat 33, and a cool liquid that, without being sent to the cool liquid cooler 31, returns to the cool liquid pump 30. The cool liquid sent to the cool liquid cooler 31 is cooled by a heat exchange unit 311 (see FIG. 6) of the cool liquid cooler 31, and is sent to a cool liquid tank 312 (see FIG. 6) of the cool liquid cooler 31. The cool liquid tanked in the cool liquid tank 312 is sent to the cool liquid pump 30 as appropriate. Further, a part of the cool liquid sent to the cool liquid cooler 31 returns via the lubricant oil cooler 32 to the cool liquid pump 30.

Figure 7:
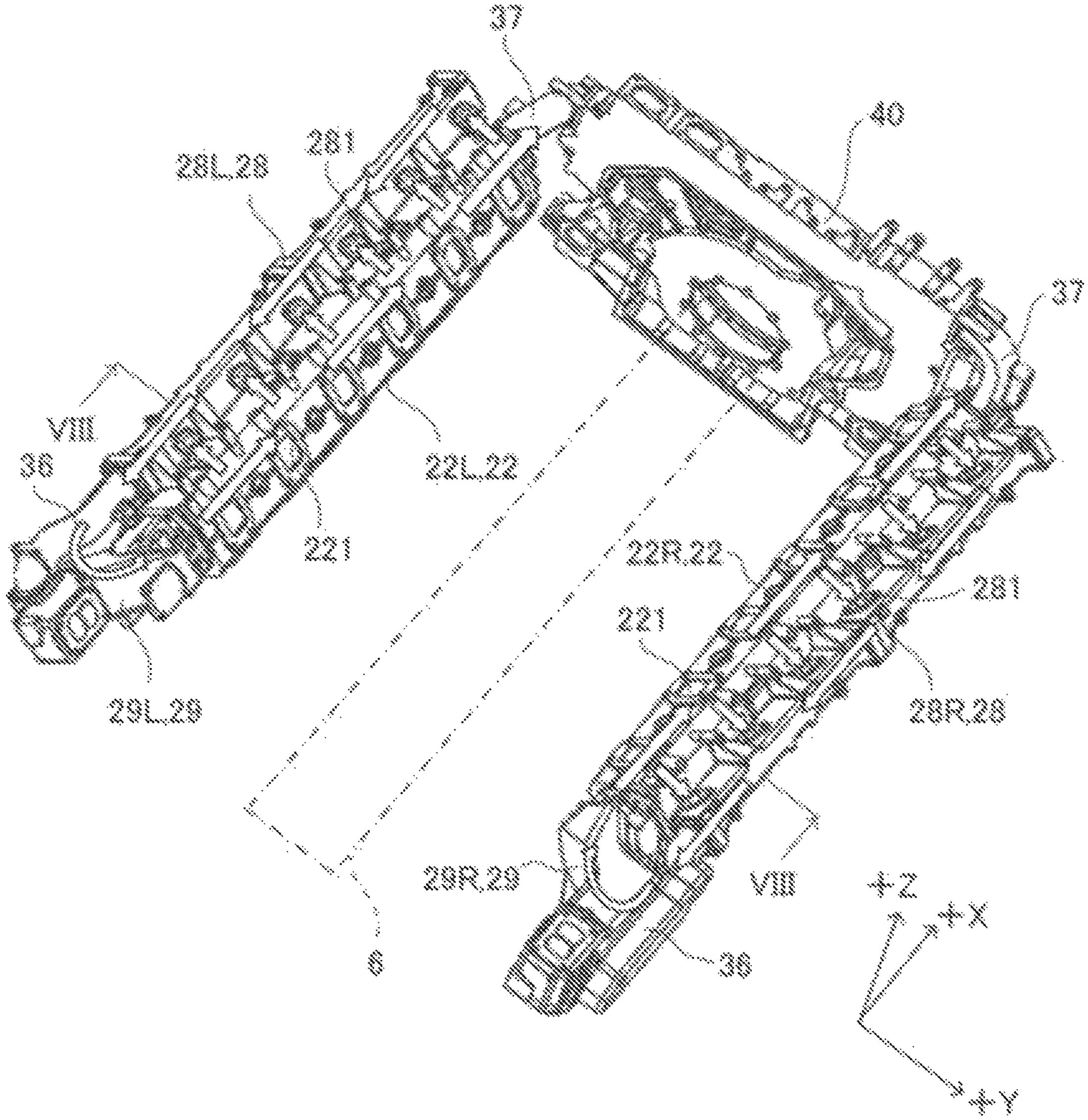
FIG. 7 is a schematic perspective view of components included in a part of each of right and left cylinder row-dedicated cool liquid flow channels.

FIG. 7 is a schematic perspective view of components included in a part of each of the right cylinder row-dedicated cool liquid flow channel 51R and the left cylinder row-dedicated cool liquid flow channel 51L. In FIG. 7, a white arrow shows the cool liquid flow. As shown in FIG. 7, the components included in the right cylinder row-dedicated cool liquid flow channel 51R include the right exhaust manifold 22R, a right cool liquid collection pipe 28R, and a right exhaust communication pipe 29R. The components included in the left cylinder row-dedicated cool liquid flow channel 51L include the left exhaust manifold 22L, a left cool liquid collection pipe 28L, and a left exhaust communication pipe 29L.

Figure 8:
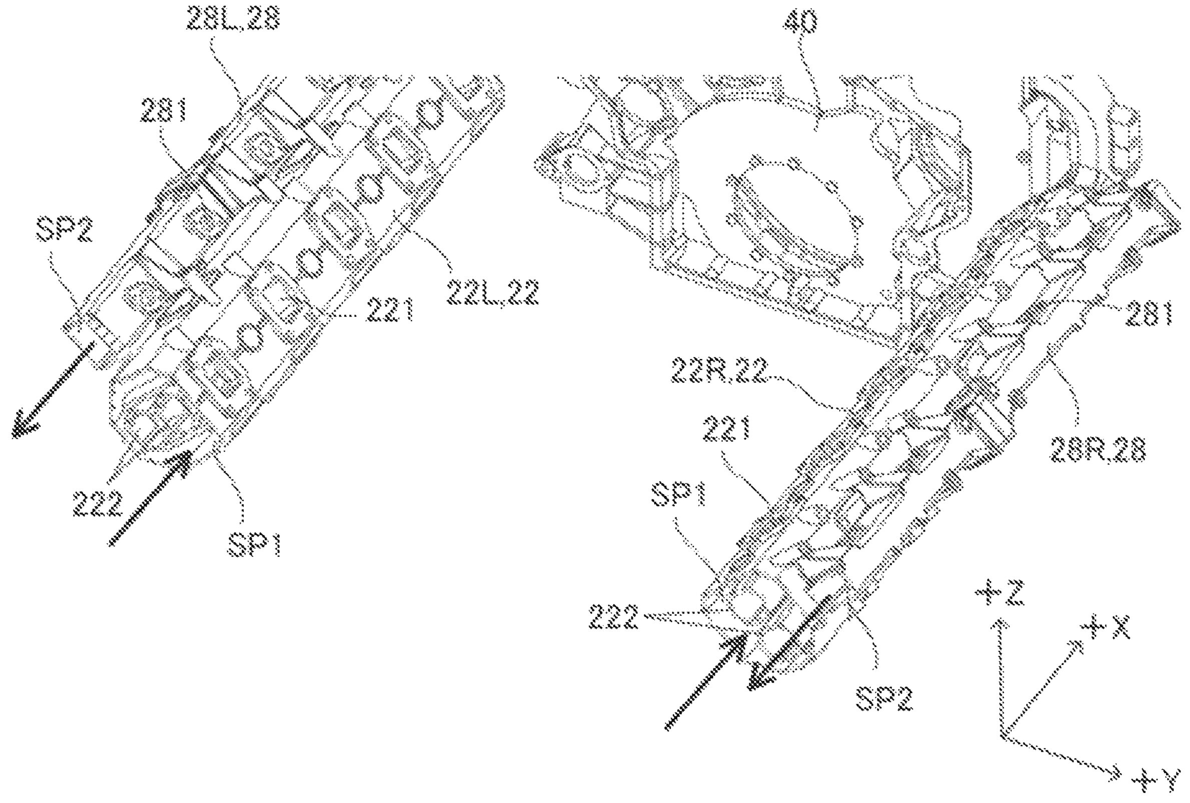
FIG. 8 is a schematic cross sectional perspective view of a cross section taken along the line VIII-VIII shown in FIG. 7.

The right exhaust manifold 22R and the left exhaust manifold 22L are each cylindrical in shape, extending in the front and back direction. FIG. 8 is a schematic cross sectional perspective view of a cross section taken along the line VIII-VIII shown in FIG. 7. In FIG. 8, a thick arrow shows the cool liquid flow. As shown in FIG. 8, the inner portion of each of the right exhaust manifold 22R and the left exhaust manifold 22L has an intra-manifold exhaust pipe 222 that communicates with an exhaust gas inlet 221 provided on the lateral side on the inside. Further, the plural exhaust gas inlets 221, in each of the exhaust manifolds 22R, 22L, are so provided as to be arranged side by side in the front and back direction, and each of the plural exhaust gas inlets 221 communicates to an exhaust port provided in one of the head blocks 4. In each of the right and left exhaust manifolds 22R and 22L, the cool liquid flows through an inner space SP1 of one of the respective exhaust manifolds 22R and 22L. In detail, the cool liquid flows around the intra-manifold exhaust pipe 222 placed in the inner space SP1.

The right cool liquid collection pipe 28R and the left cool liquid collection pipe 28L are each cylindrical, extending in the front and back direction. The right cool liquid collection pipe 28R is placed alongside the right exhaust manifold 22R, and is mounted to the right exhaust manifold 22R. The right cool liquid collection pipe 28R is placed diagonally to the right of the right exhaust manifold 22R. The left cool liquid collection pipe 28L is placed alongside the left exhaust manifold 22L, and is mounted to the left exhaust manifold 22L. The left cool liquid collection pipe 28L is placed diagonally to the left of the left exhaust manifold 22L.

A plurality of cool liquid holes 281 is provided on the lateral side on the inside of each of the right cool liquid collection pipe 28R and the left cool liquid collection pipe 28L. In each of the cool liquid collection pipes 28R, 28L, the same number of cool liquid holes 281 as the number of cylinders (cylinders) included in one of the respective cylinder rows 111R, 111L are so placed as to be spaced apart in the front and back direction. In the present embodiment, the number of cool liquid holes 281 in each of the cool liquid collection pipes 28R, 28L is six.

A cool liquid pipe (not shown) connects each of the cool liquid holes 281 to a cool liquid flow channel provided in each of the head blocks 4. The cool liquid discharged from the cool liquid pipe that connects to the cool liquid flow channel of each of the head blocks 4 included in the right bank RB flows via one of the cool liquid holes 281 into an inner space SP2 of the right cool liquid collection pipe 28R. The cool liquid discharged from the cool liquid pipe that connects to the cool liquid flow channel of each of the head blocks 4 included in the left bank LB flows via one of the cool liquid holes 281 into the inner space SP2 of the left cool liquid collection pipe 28L.

As shown in FIG. 7, the right exhaust communication pipe 29R is connected to the back end of the right exhaust manifold 22R. The left exhaust communication pipe 29L is connected to the back end of the left exhaust manifold 22L. As shown in FIG. 1, the right exhaust communication pipe 29R is connected to the turbine unit 232 of the right turbocharger 23R. The left exhaust communication pipe 29L is connected to the turbine unit 232 of the left turbocharger 23L. In other words, the right exhaust communication pipe 29R connects the right exhaust manifold 22R with the right turbocharger 23R. The left exhaust communication pipe 29L connects the left exhaust manifold 22L with the left turbocharger 23L. That is, the engine 100 is provided with an exhaust communication pipe 29 that connects the exhaust manifold 22 with the turbocharger 23.

Figure 9:
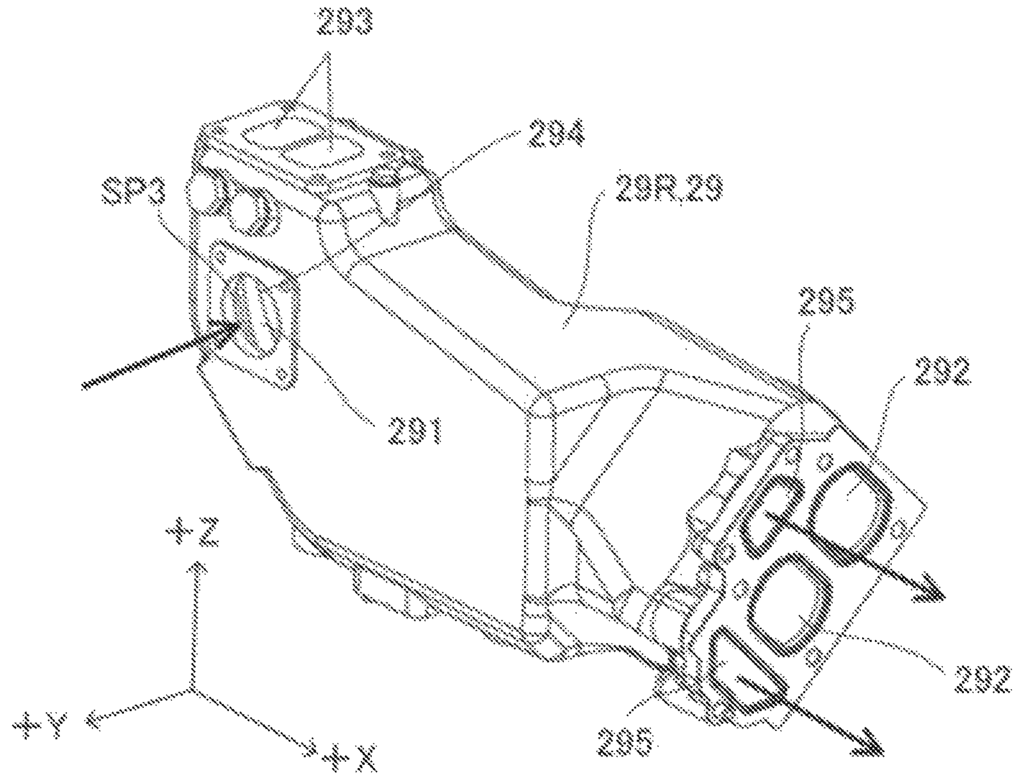
FIG. 9 is a schematic perspective view of a right communication pipe provided in the engine.

FIG. 9 is a schematic perspective view of a configuration of the right exhaust communication pipe 29R provided in the engine 100 according to the embodiment of the present invention. In FIG. 9, a thick arrow shows the cool liquid flow. Further, the left exhaust communication pipe 29L is the same in main configuration as the right exhaust communication pipe 29R. Due to this, the configuration of the exhaust communication pipe 29 is to be described with the right exhaust communication pipe 29R as a typical example.

As shown in FIG. 9, the inner portion of the right exhaust communication pipe 29R has a space SP3. In this inner space SP3, an intra-communication pipe exhaust pipe 291 through which the exhaust gas passes is placed. On the front face of the right exhaust communication pipe 29R, an exhaust inlet 292 that connects to one end of the intra-communication pipe exhaust pipe 291 is provided. In a state of the right exhaust communication pipe 29R being connected to the right exhaust manifold 22R, the intra-communication pipe exhaust pipe 291 and the intra-manifold exhaust pipe 222 communicate with each other.

Further, the right exhaust communication pipe 29R is provided with an exhaust outlet 293 that connects to the other end of the intra-communication pipe exhaust pipe 291. In a state of the right exhaust communication pipe 29R being connected to the turbine unit 232 of the right turbocharger 23R, the intra-communication pipe exhaust pipe 291 and the inner portion of the turbine unit 232 communicate with each other. That is, the exhaust gas from each combustion chamber of the right bank RB is sent to the turbine unit 232 of the right turbocharger 23R through the intra-manifold exhaust pipe 222 of the right exhaust manifold 22R and the intra-communication pipe exhaust pipe 291 of the right exhaust communication pipe 29R. Similarly, the exhaust gas from each combustion chamber of the left bank LB is sent to the turbine unit 232 of the left turbocharger 23L through the intra-manifold exhaust pipe 222 of the left exhaust manifold 22L and the intra-communication pipe exhaust pipe 291 of the left exhaust communication pipe 29L.

As shown in FIG. 9, the right exhaust communication pipe 29R is provided with a cool liquid inlet 294 which is an inlet for the cool liquid. In detail, the cool liquid inlet 294 is placed on the right side of the right exhaust communication pipe 29R. However, the place where the cool liquid inlet 294 is provided may be changed as needed. As shown in FIG. 7, the cool liquid inlet 294 communicates via a cool liquid communication pipe 36 with the inner space SP2 of the right cool liquid collection pipe 28R. Further, on the front face of the right exhaust communication pipe 29R, a cool liquid outlet 295 which is the outlet for the liquid water is provided. In a state of the right exhaust communication pipe 29R being connected to the right exhaust manifold 22R, the cool liquid outlet 295 communicates with the inner space SP1 of the right exhaust manifold 22R.

In the right exhaust communication pipe 29R, the cool liquid entering the inner space SP3 from the cool liquid inlet 294 flows around the intra-communication pipe exhaust pipe 291, to be discharged from the cool liquid outlet 295. Similarly, in the left exhaust communication pipe 29L, the cool liquid entering the inner space SP3 from the cool liquid inlet 294 flows around the intra-communication pipe exhaust pipe 291, to be discharged from the cool liquid outlet 295.

The cool liquid discharged from the cool liquid pump 30 and flowing in the right cylinder row-dedicated cool liquid flow channel 51R is sent to the cool liquid flow channel for the right cylinder row 111R provided in the cylinder block 1 and in each of the head blocks 4 included in the right bank RB. As shown by the white arrow in FIG. 7, the cool liquid discharged from each of the head blocks 4 included in the right bank RB flows through in the order of the right exhaust communication pipe 29R and the right exhaust manifold 22R.

Further, the cool liquid discharged from the cool liquid pump 30 and flowing in the left cylinder row-dedicated cool liquid flow channel 51L is sent to the cool liquid flow channel for the left cylinder row 111L provided in the cylinder block 1 and in each of the head blocks 4 included in the left bank LB. As shown by the white arrow in FIG. 7, the cool liquid discharged from each of the head blocks 4 included in the left bank LB flows through in the order of the left exhaust communication pipe 29L and the left exhaust manifold 22L.

That is, in the present embodiment, the engine 100 is provided with the cool liquid flow channel 50 through which the cool liquid discharged from the engine block flows through in the order of the exhaust communication pipe 29 and the exhaust manifold 22. Creating the above configuration makes it possible to cause the cool liquid to cool the engine block (cylinder block 1 and head block 4) which is an essential portion of the engine 100. Then, sending the relatively low-temperature cool liquid, which is discharged from the engine block, first to the exhaust communication pipe 29, not the exhaust manifold 22, makes it possible to preferentially cool the front portion of the turbocharger 23 which is, in the engine 100, particularly likely to have a high temperature. This makes it possible to properly suppress the temperature increase in the exhaust inlet portion of the turbocharger 23, making it possible to suppress the turbocharger 23 from being excessively increased in temperature.

In detail, the cool liquid discharged from each of the head blocks 4 included in the right bank RB flows through in the order of the right cool liquid collection pipe 28R, the right exhaust communication pipe 29R, and the right exhaust manifold 22R. Further, the cool liquid discharged from each of the head blocks 4 included in the left bank LB flows through in the order of the left cool liquid collection pipe 28L, the left exhaust communication pipe 29L, and the left exhaust manifold 22L. That is, the cool liquid flow channel 50 includes a cool liquid collection pipe 28 which collects the cool liquid discharged from several portions of the engine block and discharges the cool liquid to the exhaust communication pipe 29.

In the present embodiment, the exhaust manifold 22 and the cool liquid collection pipe 28 are placed parallel to the crankshaft 6. In other words, the exhaust manifold 22 and the cool liquid collection pipe 28 are placed alongside the crankshaft 6. In detail, the exhaust manifold 22 and the cool liquid collection pipe 28 are placed alongside the crankshaft 6 in the right and left direction. More in detail, the right exhaust manifold 22R and the right cool liquid collection pipe 28R are so placed as to be arranged on the right side of the crankshaft 6. The left exhaust manifold 22L and the left cool liquid collection pipe 28L are so placed as to be arranged side by side on the left side of the crankshaft 6.

At least a part of the turbocharger 23 is placed more on one side in the crankshaft direction than the exhaust manifold 22. In this example, one side in the crankshaft direction refers to the back side. In detail, at least a part of the right turbocharger 23R is placed behind the right exhaust manifold 22R and the right cool liquid collection pipe 28R. At least a part of the left turbocharger 23L is placed behind the left exhaust manifold 22L and the left cool liquid collection pipe 28L. Creating the above placement allows the configuration connecting the exhaust communication pipe 29, which is placed near the turbocharger 23, with both the cool liquid collection pipe 28 and the exhaust manifold 22, to be made without complicated geometry. That is, a compact and simple configuration can be formed for the cool liquid flow channel in which the cool liquid flows through in the order of the cool liquid collection pipe 28, the exhaust communication pipe 29, and the exhaust manifold 22.

At an end portion on the other side of the engine 100 in the crankshaft direction, there is placed a cool liquid flow channel component to which the cool liquid flowing through the exhaust manifold 22 is sent. In this example, the other side in the crankshaft direction refers to the front side.

As shown by the white arrow in FIG. 7, the cool liquid flowing through the right exhaust manifold 22R and the left exhaust manifold 22L flows from back to front. Due to this, placing the cool liquid flow channel component in the end portion on the back side of the engine 100 can be efficiently place the component included in the engine 100.

The cool liquid flow channel component may include a wide range of components included in the cool liquid flow channel. The cool liquid flow channel component may include, for example, a cool pipe through which the cool liquid flows. The cool liquid flow channel component is preferably a component related to cooling of the cool liquid. In detail, the cool liquid flow channel component preferably includes at least one of the thermostat case 34 which cases the thermostat 33, and the cool liquid cooler 31. The cool liquid discharged from the exhaust manifold 22 is higher in temperature than when being discharged from the cool liquid pump 30 while taking heat from the exhaust gas and the like. Due to this, creating the configuration in which the cool liquid cooler 31 and thermostat 33, which is used as a set with the cool liquid cooler 31, are placed near where the cool liquid is discharged from the exhaust manifold 22 can effectively cool the cool liquid for keeping a cooling performance.

Further, in the present embodiment, the cool liquid cooler 31 is a fresh water cooler as described above, but may be other than the fresh water cooler, for example, a radiator. That is, the category of the cool liquid coolers may include the fresh water cooler and the radiator.

The first cool liquid flow channel 50R includes a right cool liquid collection pipe (first cool liquid collection pipe) 28R that collects the cool liquid having cooled one of the two cylinder rows 111R and 111L. The first cool liquid flow channel 50R further includes a water-cooled right exhaust communication pipe 29R that is connected to the right cool liquid collection pipe 28R, and a water-cooled right exhaust manifold 22R that is connected to the right exhaust communication pipe 29R. In detail, the right cool liquid collection pipe 28R, the water-cooled right exhaust communication pipe 29R, and the water-cooled right exhaust manifold 22R constitute the right cylinder row-dedicated cool liquid flow channel 51R.

The second cool liquid flow channel 50L includes a left cool liquid collection pipe (second cool liquid collection pipe) 28L that collects the cool liquid having cooled the other of the two cylinder rows 111R and 111L. The second cool liquid flow channel 50L further includes a water-cooled left exhaust communication pipe 29L that is connected to the left cool liquid collection pipe 28L, and a water-cooled left exhaust manifold 22L that is connected to the left exhaust communication pipe 29L. In detail, the left cool liquid collection pipe 28L, the water-cooled left exhaust communication pipe 29L, and the water-cooled left exhaust manifold 22L constitute the left cylinder row-dedicated cool liquid flow channel 51L.

In the present embodiment, as shown in FIG. 7, the cool liquid discharged from the right exhaust manifold 22R flows via a cool pipe 37 into the cool liquid flow channel provided in the gear case 40. The cool liquid discharged from the left exhaust manifold 22L flows via the cool pipe 37 into the cool liquid flow channel provided in the gear case 40. That is, the engine 100 has the gear case 40 in which a part of the first cool liquid flow channel 50R and a part of the second cool liquid flow channel 50L are provided. However, this is an exemplification; it may be so configured that the gear case 40 is provided with a part of the first cool liquid flow channel 50R and/or a part of the second cool liquid flow channel 50L.

The gear case 40 cases a gear (not shown) that transmits the rotational power of the crankshaft 6, for example, to the rotary shafts of the cool liquid pump 30, the seawater pump 35, an alternator (not shown), etc. That is, the configuration according to the present embodiment uses the gear case 40, which is an accessory part originally provided in the engine 100, thereby to form the cool liquid flow channel 50 of the two cylinder rows 111R and 111L. Thus, in the engine 100 provided with the two cylinder rows 111R and 111L, the cool liquid flow channel 50 can be configured while suppressing the number of components from being increased. Because the number of components can be reduced, the engine 100 can be made more compact by reducing the space in which the cool liquid flow channel 50 is placed.

Further, in the present embodiment, the cool liquid pump 30 and the seawater pump 35 are mounted to the gear case 40. Further, the gear case 40 is placed forward of the two cylinder rows 111R and 111L. The gear case 40 is placed forward of the engine block.

Figure 10:
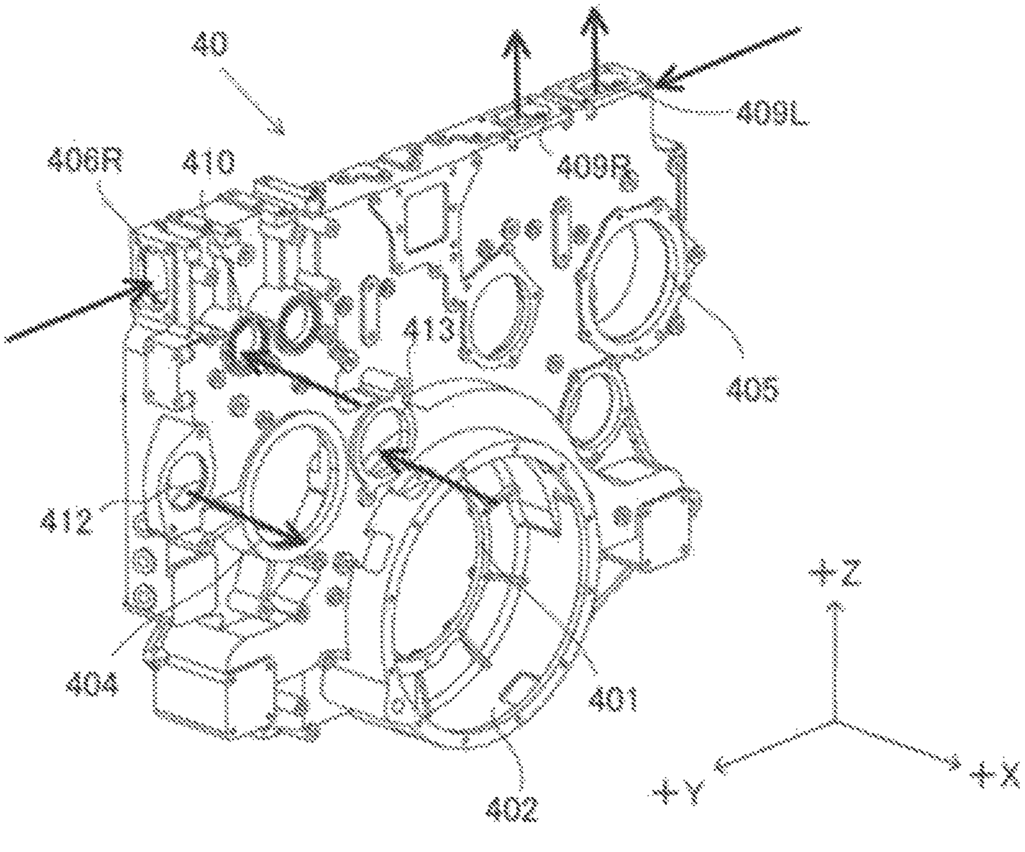
FIG. 10 is a schematic perspective view of the configuration of a gear case provided in the engine.
Figure 11:
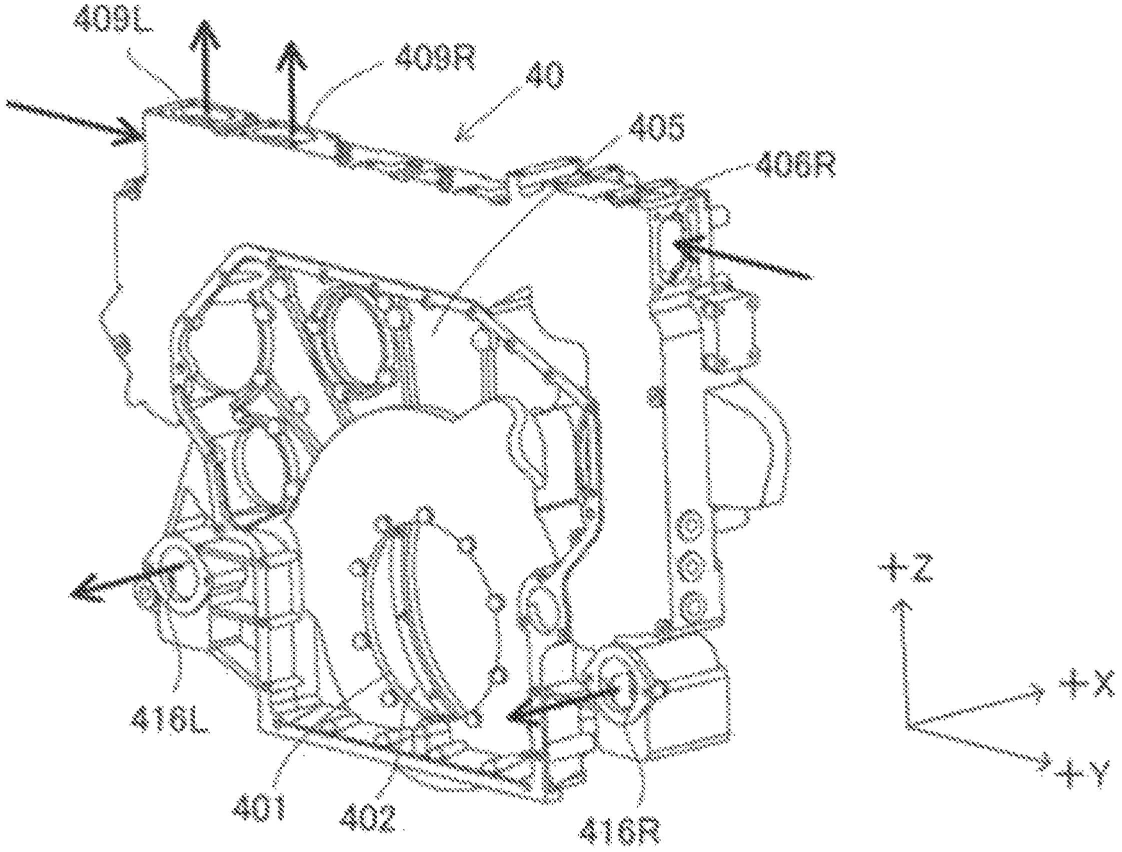
FIG. 11 is a schematic perspective view of the gear case when viewed from a direction different from that in FIG. 10.
Figure 12:
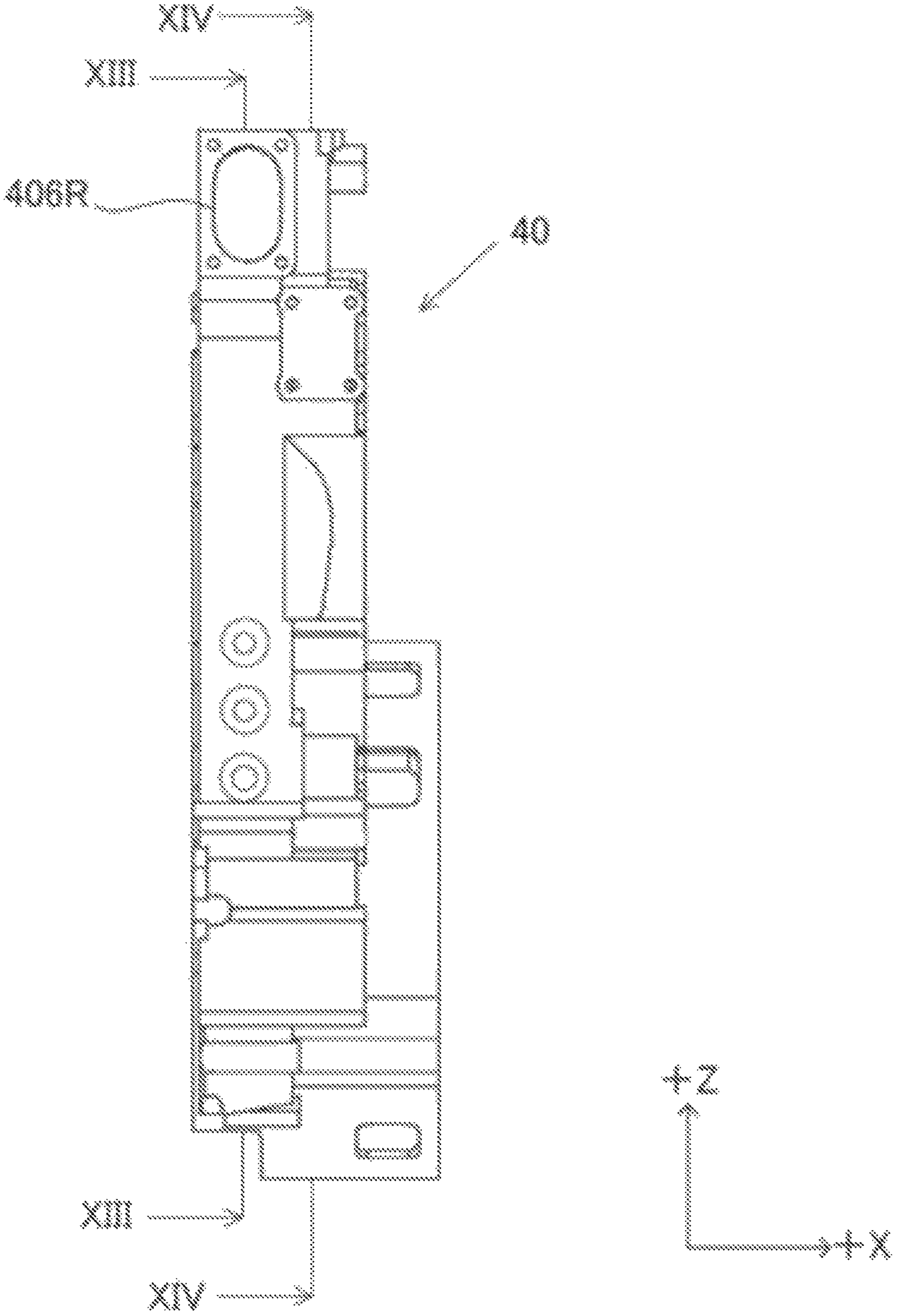
FIG. 12 is a schematic right side view of the configuration of the gear case provided in the engine.
Figure 13:
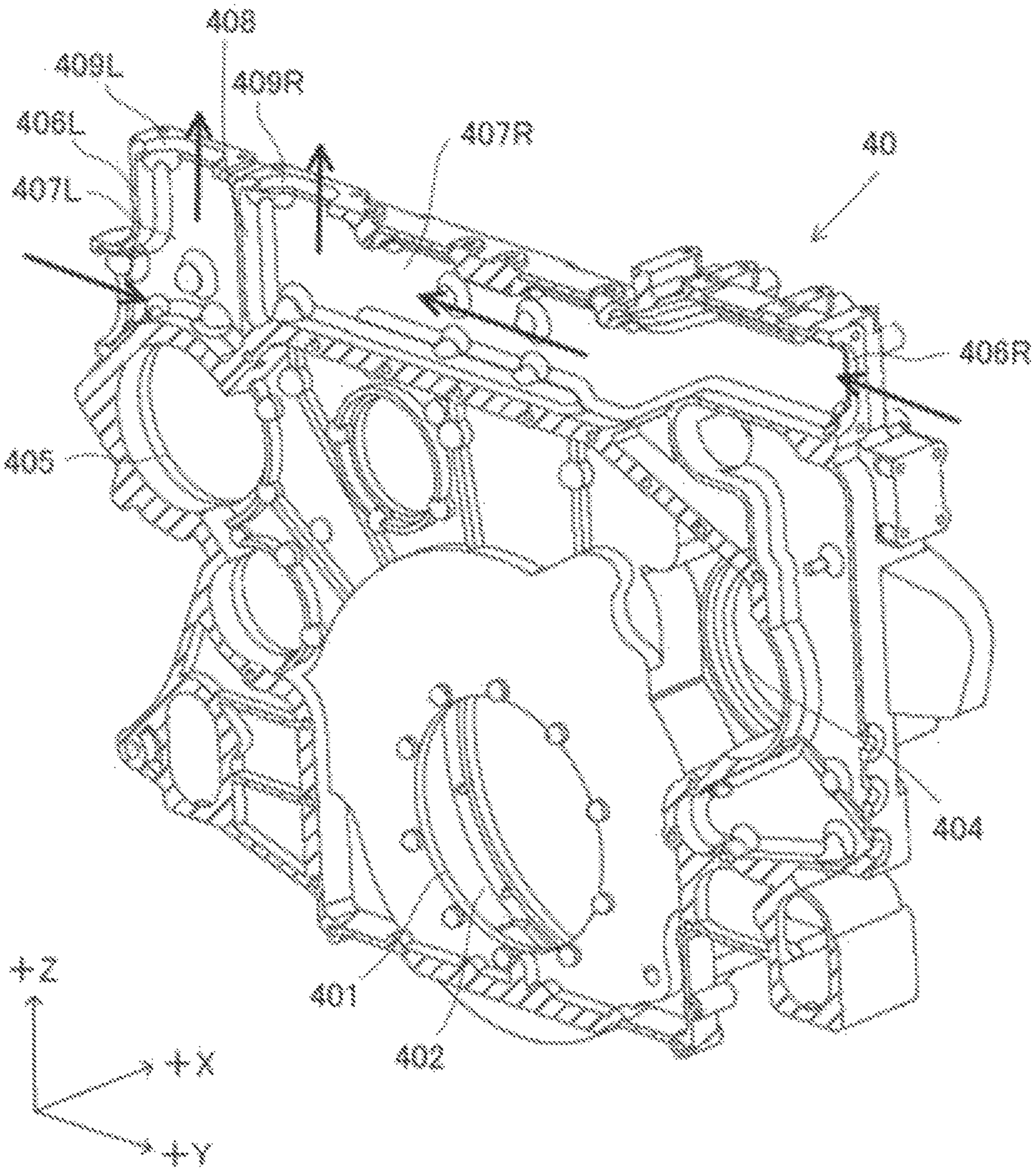
FIG. 13 is a schematic cross sectional perspective view of a cross section taken along the line XIII-XIII shown in FIG. 12.
Figure 14:
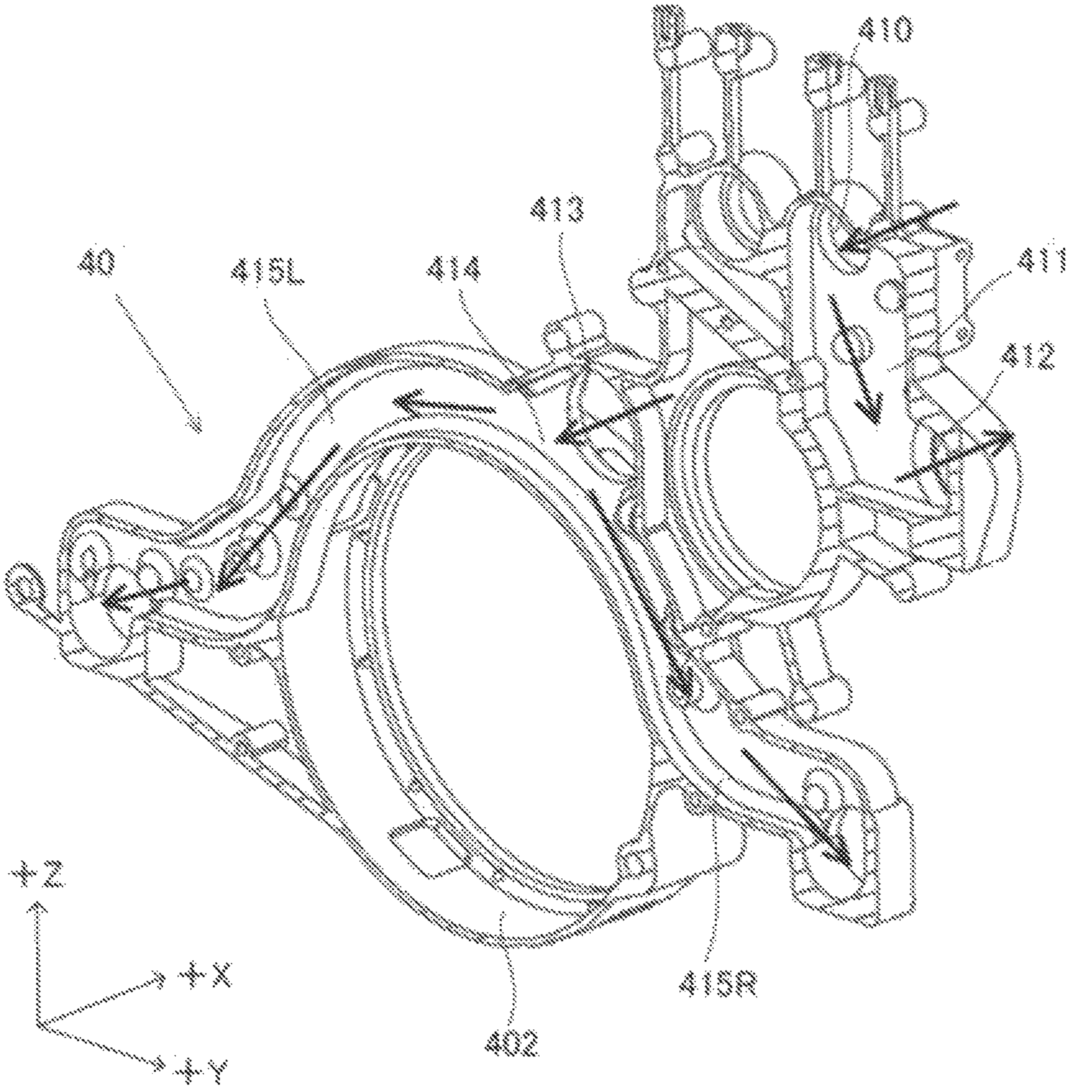
FIG. 14 is a schematic cross sectional perspective view of a cross section taken along the line XIV-XIV shown in FIG. 12.

FIG. 10 is a schematic perspective view of a configuration of the gear case 40 provided in the engine 100 according to the embodiment of the present invention. FIG. 11 is a schematic perspective view of the gear case 40 when viewed from a direction different from that in FIG. 10. FIG. 10 shows the gear case 40 viewed from the right diagonally forward. FIG. 11 shows the gear case 40 viewed from the right diagonally backward. FIG. 12 is a schematic right side view of the configuration of the gear case 40 provided in the engine 100. FIG. 13 is a schematic cross sectional perspective view of a cross section taken along the line XIII-XIII shown in FIG. 12. FIG. 14 is a schematic cross sectional perspective view of a cross section taken along the line XIV-XIV shown in FIG. 12. In FIGS. 10, 11, 13, and 14, the thick arrow shows the cool liquid flow.

As shown in FIGS. 10 to 14, the gear case 40 is plate-shaped, thick in the front and back direction, and spread out in a direction orthogonal to the front and back direction. In plan view from the front and back direction, the gear case 40, to the lower in the center, has a crankshaft hole 401 which passes through in the front and back direction. The front end portion of the crankshaft 6 is inserted into the crankshaft hole 401. Further, the gear case 40 has a bearing receiving recess portion 402 forward of the crankshaft hole 401. The bearing receiving recess portion 402 is recessed from frontward to backward, and receives a bearing 38 (see FIG. 6) by which the crankshaft 6 is rotatably supported. Further, the gear case 40, on the back side, has a gear receiving recess portion 403 that is recessed toward the front. The gear receiving recess portion 403 receives a plurality of gears (not shown) that transmit the rotational power of the crankshaft 6. The plurality of gears includes, for example, a gear that transmits the rotational power to the cool liquid pump 30, and a gear that transmits the rotational power to the seawater pump 35. The gear case 40, on the front right side, has a cool liquid pump mounting opening 404 for mounting the cool liquid pump 30. Further, the gear case 40, on the front left side, has a seawater pump mounting opening 405 for mounting the seawater pump 35.

The gear case 40, in the upper portion on the right side face, has a right side cool liquid inlet 406R for receiving the cool liquid from the right cool liquid collection pipe 28R. The right side cool liquid inlet 406R connects to a right cylinder row-dedicated first intra-case flow channel 407R (see FIG. 13) which is provided inside the gear case 40. The right cylinder row-dedicated first intra-case flow channel 407R is provided in the upper portion of the gear case 40, and extends in the right and left direction. Further, the right cylinder row-dedicated first intra-case flow channel 407R is included in the first cool liquid flow channel 50R, and, in detail, included in the right cylinder row-dedicated cool liquid flow channel 51R.

Further, the gear case 40, in the upper portion on the left side face, has a left side cool liquid inlet 406L for receiving the cool liquid from the left cool liquid collection pipe 28L. The left side cool liquid inlet 406L connects to a left cylinder row-dedicated first intra-case flow channel 407L (see FIG. 13) which is provided inside the gear case 40. The left cylinder row-dedicated first intra-case flow channel 407L is provided in the upper portion of the gear case 40, and is placed to the left of the right cylinder row-dedicated first intra-case flow channel 407R. Further, the left cylinder row-dedicated first intra-case flow channel 407L is included in the second cool liquid flow channel 50L, and, in detail, included in the left cylinder row-dedicated cool liquid flow channel 51L.

The right cylinder row-dedicated first intra-case flow channel 407R and the left cylinder row-dedicated first intra-case flow channel 407L, in the gear case 40, are partitioned by a bulkhead 408 extending in the up and down direction. That is, the gear case 40 has the bulkhead 408 that partitions the first cool liquid flow channel 50R from the second cool liquid flow channel 50L. A difference in water pressure may be caused between the cool liquid entering the gear case 40 from the right side cool liquid inlet 406R and the cool liquid entering the gear case 40 from the left side cool liquid inlet 406L. In the above case, without the bulkhead 408, backflow due to the pressure difference may be caused. Providing the bulkhead 408 can prevent the backflow due to the above pressure difference. It may be so configured that; when the cool liquid entering the gear case 40 from the right side cool liquid inlet 406R and the cool liquid entering the gear case 40 from the left side cool liquid inlet 406L each have a sufficient pressure, and flow downstream without causing the backflow due to the pressure difference, without providing the bulkhead 408, the cool liquid entering the gear case 40 from the right side cool liquid inlet 406R and the cool liquid entering the gear case 40 from the left side cool liquid inlet 406L merge in the gear case 40.

On the upper face of the gear case 40, there are provided a right upper face cool liquid outlet 409R and a left upper face cool liquid outlet 409L. To the left end on the upper face of the gear case 40, the right upper face cool liquid outlet 409R and the left upper face cool liquid outlet 409L are so placed as to be arranged on right and left. The right upper face cool liquid outlet 409R is placed to the right of the left upper face cool liquid outlet 409L. The right upper face cool liquid outlet 409R connects to the right cylinder row-dedicated first intra-case flow channel 407R. The left upper face cool liquid outlet 409L connects to the left cylinder row-dedicated first intra-case flow channel 407L.

The cool liquid entering the right cylinder row-dedicated first intra-case flow channel 407R from the right side face cool liquid inlet 406R is discharged out of the gear case 40 from the right upper face cool liquid outlet 409R and sent to the thermostat case 34. The cool liquid entering the left cylinder row-dedicated first intra-case flow channel 407L from the left side cool liquid inlet 406L is discharged out of the gear case 40 from the left upper face cool liquid outlet 409L and sent to the thermostat case 34. That is, the cool liquids entering the gear case 40 from the right cool liquid collection pipe (first cool liquid collection pipe) 28R and the left cool liquid collection pipe (second cool liquid collection pipe) 28L are discharged to the thermostat case 34 which cases the thermostat 33. However, this is an exemplification; it may be so configured that the cool liquid entering the gear case 40 from the right cool liquid collection pipe 28R and/or the left cool liquid collection pipe 28L is discharged to the thermostat case 34 which cases the thermostat 33.

As shown in FIGS. 10 and 14, the gear case 40, to the right in the upper portion on the front face, has a first front cool liquid inlet 410 that leads the cool liquid, which is discharged from the lubricant oil cooler 32, to the inner portion of the gear case 40. The inner portion of the gear case 40 has a shared intra-case flow channel 411 that connects to the first front cool liquid inlet 410. The shared intra-case flow channel 411 is included in the shared cool liquid flow channel 52. The gear case 40, in the right end portion of the front face, has a front cool liquid outlet 412 that connects to the shared intra-case flow channel 411. The front cool liquid outlet 412 is placed to the right and lower than the first front cool liquid inlet 410. The cool liquid entering the shared intra-case flow channel 411 from the first front cool liquid inlet 410 is discharged out of the gear case 40 from the front cool liquid outlet 412 and sent to the cool liquid pump 30.

As can be seen from the above, the gear case 40 has the shared cool liquid flow channel 52 that is shared by both the first cool liquid flow channel 50R and the second cool liquid flow channel 50L. In detail, the gear case 40 has a part of the shared cool liquid flow channel 52. The shared cool liquid flow channel 52 provided in the gear case 40 includes a flow channel that leads the cool liquid, which is discharged from the lubricant oil cooler 32 that cools the lubricant oil, to the cool liquid pump 30.

Further, as shown in FIGS. 10 and 14, the gear case 40, in the center portion of the front face, has a second front cool liquid inlet 413 that leads the cool liquid, which is discharged from the cool liquid pump 30, to inner portion of the gear case 40. The inner portion of the gear case 40 has a branch unit 414 that connects to the second front cool liquid inlet 413 and that divides the cool liquid into the first cool liquid flow channel 50R and the second cool liquid flow channel 50L. The branch unit 414 is included in the shared cool liquid flow channel 52.

As shown in FIG. 14, the inner portion of the gear case 40 has a right cylinder row-dedicated second intra-case flow channel 415R which connects to the branch unit 414, and extends diagonally downward to the right. The right cylinder row-dedicated second intra-case flow channel 415R is included in the first cool liquid flow channel 50R, and, in detail, included in the right cylinder row-dedicated cool liquid flow channel 51R. Further, the inner portion of the gear case 40 has a left cylinder row-dedicated second intra-case flow channel 415L which connects to the branch unit 414, and extends diagonally downward to the left. The left cylinder row-dedicated second intra-case flow channel 415L is included in the second cool liquid flow channel 50L, and, in detail, included in the left cylinder row-dedicated cool liquid flow channel 51L.

As shown in FIG. 11, the gear case 40, at the right end in the lower portion on the back face, has a right back face cool liquid outlet 416R that connects to the right cylinder row-dedicated second intra-case flow channel 415R. Further, the gear case 40, at the left end in the lower portion on the back face, has a left back face cool liquid outlet 416L that connects to the left cylinder row-dedicated second intra-case flow channel 415L.

The cool liquid discharged from the cool liquid pump 30 is divided, at the branch unit 414, into the cool liquid flowing in the right cylinder row-dedicated second intra-case flow channel 415R, and the cool liquid flowing in the left cylinder row-dedicated second intra-case flow channel 415L. The cool liquid flowing in the right cylinder row-dedicated second intra-case flow channel 415R is discharged out of the gear case 40 from the right back face cool liquid outlet 416R, and is sent to the right cylinder row-dedicated cool flow channel provided in the cylinder block 1. The cool liquid flowing in the left cylinder row-dedicated second intra-case flow channel 415L is discharged out of the gear case 40 from the left back face cool liquid outlet 416L, and is sent to the left cylinder row-dedicated cool flow channel provided in the cylinder block 1.

As can be seen from the above, a part of the first cool liquid flow channel 50R provided in the gear case 40 includes a flow channel that leads the cool liquid, which is supplied from the cool liquid pump 30, to one of the two cylinder rows 111R and 111L. Also, a part of the second cool liquid flow channel 50L provided in the gear case 40 includes a flow channel that leads the cool liquid, which is supplied from the cool liquid pump 30, to the other of the two cylinder rows 111R and 111L. In this example, one of the two cylinder rows 111R and 111L is the right cylinder row 111R. The other of the two cylinder rows 111R and 111L is the left cylinder row 111L.

In the present embodiment, the inner portion of the gear case 40 is provided with the multiple types of flow channels that flow the cool liquids, making it possible to efficiently form the cool liquid flow channel 50.

3. Cool Liquid Cooler and Lubricant Oil Cooler

As described above, the engine 100 is provided with the cool liquid cooler 31 and the lubricant oil cooler 32. The cool liquid cooler 31 cools the cool liquid that cools the engine block (engine body). The lubricant oil cooler 32 cools the lubricant oil using the cool liquid that cools the engine block. Further, in the present embodiment, the lubricant oil cooler 32 cools the lubricant oil using the cool liquid cooled by the cool liquid cooler 31, which is an exemplification. The lubricant oil cooler 32 may be cooled by a cool liquid different from that cooled by cool liquid cooler 31. That is, the lubricant oil cooler 32 may be so configured as to cool the lubricant oil using a first cool liquid that cools the engine block or a second cool liquid that is different from the first cool liquid. For example, the first cool liquid may be fresh water, and the second cool liquid may be seawater.

As shown in FIG. 6, the cool liquid cooler 31 and the lubricant oil cooler 32 are so placed as to be arranged side by side on one end side in the crankshaft direction in the engine 100. In this example, one end side in the crankshaft direction is the front end side. The cool liquid cooler 31 and the lubricant oil cooler 32 are so placed as to be arranged side by side at the front of the engine 100.

So placing the cool liquid cooler 31 and the lubricant oil cooler 32 as to be arranged side by side on one end side of the engine 100 in the crankshaft direction makes it possible to suppress the engine 100's length in the crankshaft direction from being increased, compared to when the cool liquid cooler 31 and the lubricant oil cooler 32 are arranged separately on one end side and the other end side in the crankshaft direction. Further, so placing the cool liquid cooler 31 and the lubricant oil cooler 32 as to be arranged side by side on one end side of the engine 100 in the crankshaft direction makes it possible to suppress the engine 100's length in the width direction from being increased, compared to when at least one of the cool liquid cooler 31 and the lubricant oil cooler 32 is placed on the side of the engine 100.

When the engine 100 is a V-type engine provided with the two cylinder rows 111R and 111L as in the present embodiment, the area of the end face of the engine 100 in the crankshaft direction is large. Due to this, the engine 100 in the present embodiment makes it easy to so place the cool liquid cooler 31 and the lubricant oil cooler 32 to be arranged on one end face in the crankshaft direction. Further, according to the engine 100 of the present embodiment, the up and down and right and left sizes of each of the cool liquid oil cooler 31 and the lubricant oil cooler 32 can be increased even when the cool liquid oil cooler 31 and the lubricant oil cooler 32 are so placed as to be arranged on one end face in the crankshaft direction.

In the present embodiment, the cool liquid cooler 31 and the lubricant oil cooler 32 are so placed as to be arranged in the right and left direction. However, the direction in which the cool liquid cooler 31 and the lubricant oil cooler 32 are arranged is not limited to the right and left direction, but can be, for example, the up and down direction.

The gear case 40 provided in the engine 100 may be placed between the engine block (such as cylinder block 1) and the cool liquid cooler 31 and/or the lubricant oil cooler 32. The cool liquid cooler 31 and/or the lubricant oil cooler 32 may be mounted to the gear case 40. In the present embodiment, the gear case 40 is placed between the engine block and the cool liquid cooler 31 and lubricant oil cooler 32. In detail, the gear case 40 is placed between the engine block and the cool liquid cooler 31 in the crankshaft direction. The cool liquid cooler 31 and the lubricant oil cooler 32 are mounted to the gear case 40.

Creating the configuration where each of the cool liquid cooler 31 and the lubricant oil cooler 32 is mounted to the gear case 40, which is originally provided in the engine 100, prevents the number of components of the engine 100 from being increased. This accomplishes compactness of the engine 100. Further, the gear case 40 is fixed directly to the cylinder block 1, making it difficult to sway. Due to this, creating the configuration where the cool liquid cooler 31 and the lubricant oil cooler 32 are mounted to the gear case 40 can suppress a vibration of each of the coolers 31 and 32.

Figure 15:
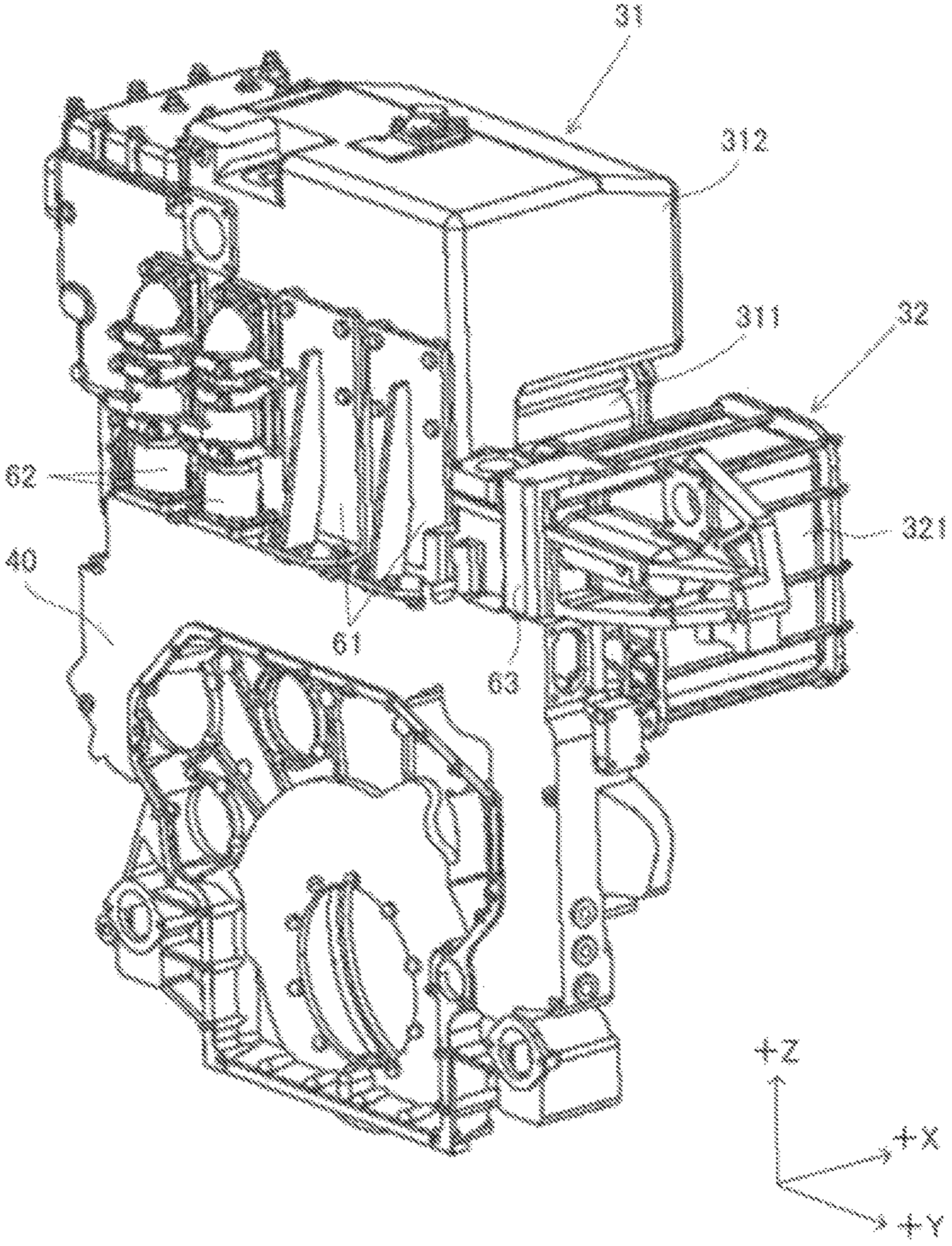
FIG. 15 is a schematic perspective view of the configuration of mounting a cool liquid cooler and a lubricant oil cooler which are provided in the engine.

FIG. 15 is a schematic perspective view of the configuration of mounting the cool liquid cooler 31 and the lubricant oil cooler 32 which are provided in the engine 100 according to the embodiment of the present invention. The lower portion of the cool liquid cooler 31 is directly mounted to the gear case 40 using a screw or other fixture. Then, the upper portion of the cool liquid cooler 31 is mounted to a cool liquid cooler support member 61 (see FIG. 15) using a screw or other fixture. The cool liquid cooler support member 61 is an L-shaped sheet metal member, and is mounted to the upper face of the gear case 40. That is, the upper portion of the cool liquid cooler 31 is indirectly mounted to the gear case 40 using the cool liquid cooler support member 61.

Also, in the present embodiment, the number of cool liquid cooler support members 61 is two, and the two cool liquid cooler support members 61 are arranged right and left in the center portion of the upper face of the gear case 40. However, the number of cool liquid cooler support members 61 may be changed as needed. Further, other than the cool liquid cooler support member 61, a pipe 62 through which the cool liquid flows is mounted to the upper face of the gear case 40. The above pipe 62 is also mounted to the cool liquid cooler 31. The upper portion of the cool liquid cooler 31 can be said to be supported by the cool liquid cooler support member 61 and the pipe 62.

The lower portion of the lubricant oil cooler 32 is directly mounted to the gear case 40 using a screw or other fixture. Then, the upper portion of the lubricant oil cooler 32 is mounted to the lubricant oil cooler support member 63 (see FIG. 15) using a screw or other fixture. The lubricant oil cooler support member 63 is mounted to the upper face of the gear case 40. That is, the upper portion of the lubricant oil cooler 32 is indirectly mounted to the gear case 40 using the lubricant oil cooler support member 63. That is, in the present embodiment, the inner portion of the lubricant oil cooler support member 63 has a flow channel for the cool liquid and lubricant oil.

As described above, the inner portion of the gear case 40 has the flow channel through which the cool liquid passes. That is, the gear case 40 has an intra-case cool liquid flow channel through which the cool liquid passes. The intra-case cool liquid flow channel includes a first flow channel placed upstream of the cool liquid cooler 31, and a second flow channel placed downstream of the cool liquid cooler 31. In the present embodiment, the second flow channel is placed downstream of the lubricant oil cooler 32. Further, in the present embodiment, upstream and downstream are expressions used for the section where the cool liquid which, from the cool liquid pump 30 (as a start point) that discharges the cool liquid, flows out, and returns to the cool liquid pump 30. At a certain point in the cool liquid flow channel, the upstream side is the side for progressing in the direction opposite to the direction in which the cool liquid flows, and the downstream side is the side for progressing in the direction same as the direction in which the cool liquid flows.

In detail, the first flow channel is included in the flow channel seen before the cool liquid that has exchanged heat with the exhaust gas enters the cool liquid cooler 31. That is, the first flow channel is included in the flow channel between the exhaust manifold 22 and the cool liquid cooler 31. The first flow channel includes the right cylinder row-dedicated first intra-case flow channel 407R and the left cylinder row-dedicated first intra-case flow channel 407L (see, for example, FIG. 13) described above. Further, the second flow channel is included in the flow channel between the lubricant oil cooler 32 and the cool liquid pump 30. The second flow channel includes the shared intra-case flow channel 411 (see FIG. 14) described above. Using the inner portion of the gear case 40 as the flow channel through which the cool liquid passes can efficiently place the cool flow channel. Further, using the inner portion of the gear case 40 as a flow channel through which the cool liquid passes can reduce the number of components.

The gear case 40 also includes a third flow channel placed downstream of the cool liquid pump 30. The third flow channel, in detail, is included in the intra-case flow channel through which the cool liquid discharged from the cool liquid pump 30 passes before entering the cool liquid flow channel provided in the engine block. The third flow channel includes the right cylinder row-dedicated second intra-case flow channel 415R and the left cylinder row-dedicated second intra-case flow channel 415L described above.

Figure 16:
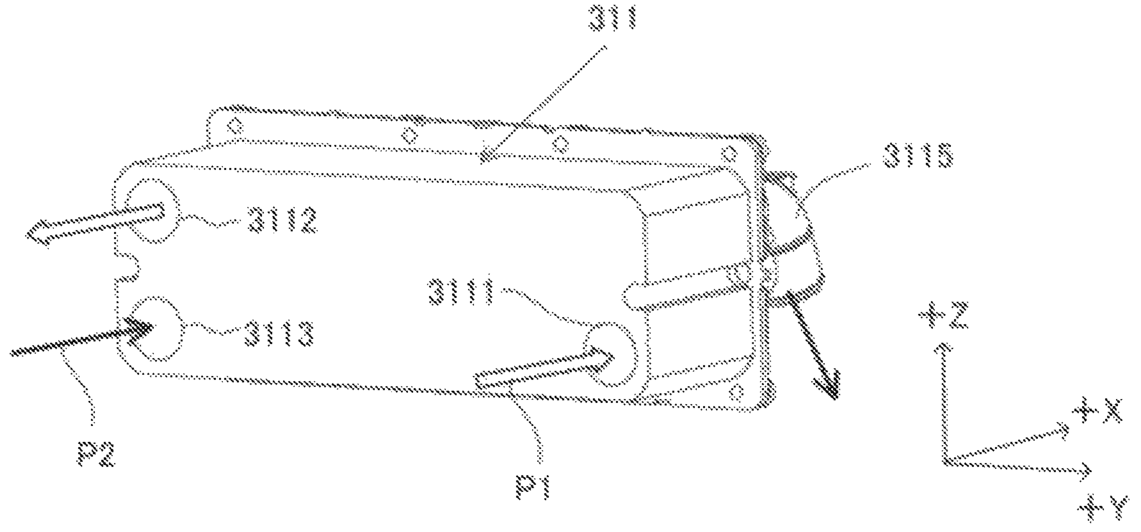
FIG. 16 is a schematic perspective view of a heat exchange unit provided in the cool liquid cooler.

FIG. 16 is a schematic perspective view of the heat exchange unit 311 provided in the cool liquid cooler 31. In FIG. 16, the white arrow P1 shows the flow of the cool liquid that cools the engine block. In detail, the white arrow P1 shows the flow of fresh water. The thick black arrow P2 shows the flow of the seawater for cooling the fresh water.

As shown in FIG. 16, the back face of the heat exchange unit 311 of the cool liquid cooler 31 has a fresh water inlet 3111 and a fresh water outlet 3112. Further, the back face of the heat exchange unit 311 has a seawater inlet 3113. The front face of the heat exchange unit 311 has a seawater outlet 3114 (see FIG. 17 below). The seawater outlet 3114 is provided with a seawater outlet pipe 3115 that directs downward the flow of the seawater discharged from the seawater outlet 3114.

Figure 17:
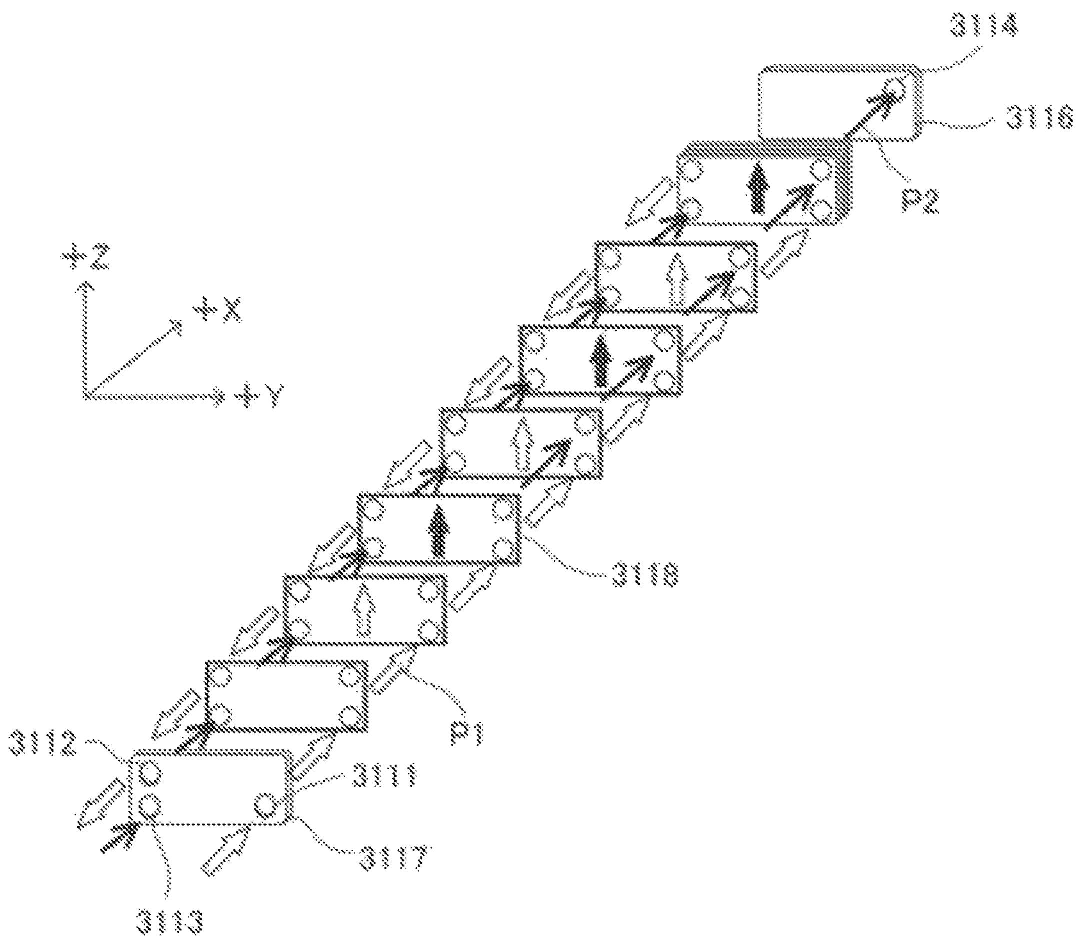
FIG. 17 is a schematic view for illustration of the configuration of the heat exchange unit of the cool liquid cooler.

FIG. 17 shows a schematic view for illustration of the configuration of the heat exchange unit 311 of the cool liquid cooler 31. In FIG. 17, the heat exchange unit 311 is partially disassembled. In FIG. 17, as in FIG. 16, the white arrow P1 shows the flow of fresh water, and the thick black arrow P2 shows the flow of the seawater. As shown in FIG. 17, the heat exchange unit 311 has a front frame 3116 and a back frame 3117. Further, the heat exchange unit 311 has a plurality of plates 3118 between the front frame 3116 and the back frame 3117 in the front and back direction. A plurality of plates 3118 is stacked in the front and back direction, and sandwiched between the front frame 3116 and the back frame 3117.

In the heat exchange unit 311 of the cool liquid cooler 31, fresh or sea water flows between each of the 3118 plates. In detail, the type of liquid flowing between the two plates 3118 is alternated. For example, the type of liquid flowing between the two plates 3118 alternates from back to front: fresh water, sea water, fresh water, sea water . . . . Creating the above configuration allows efficient heat exchange between fresh water and seawater. The heat exchange unit 311 is a so-called multi-plate heat exchange unit. That is, the cool liquid cooler 31 includes a multi-plate heat exchange unit 311.

Figure 18:
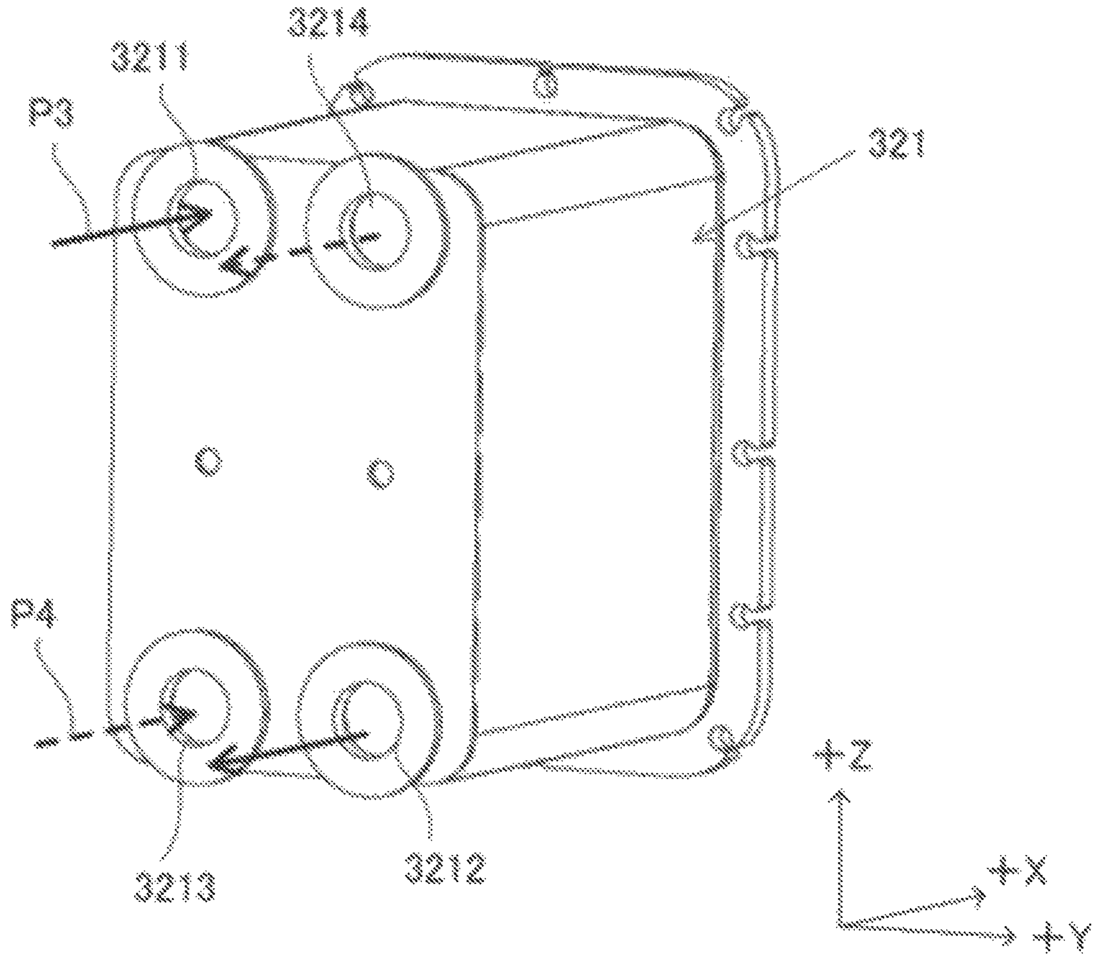
FIG. 18 is a schematic perspective view of the configuration of ae heat exchange unit provided in the lubricant oil cooler.

FIG. 18 is a schematic perspective view of the heat exchange unit 321 provided in the lubricant oil cooler 32. In FIG. 18, a solid arrow P3 shows the flow of the cool liquid that cools the engine block, and a dashed arrow P4 shows the flow of the lubricant oil. As shown in FIG. 18, the back face of the heat exchange unit 321 of the lubricant oil cooler 32 has a lubricant oil cooler cool liquid inlet 3211 which is the cool liquid (fresh water) inlet, and a lubricant oil cooler cool liquid outlet 3212 which is the cool liquid outlet. Further, the back face of the heat exchange unit 321 has a lubricant inlet 3213 and a lubricant outlet 3214.

The heat exchange unit 321 of the lubricant oil cooler 32, like the cool liquid cooler 31, is also a so-called multi-plate heat exchange unit. That is, the lubricant oil cooler 32 includes a multi-plate heat exchange unit 321. The heat exchange unit 321 has a plurality of plates that are stacked in the front and back direction. The type of liquid flowing between each of the plates alternates. For example, the type of liquid flowing between the two plates alternates from back to front: cool liquid (fresh water), lubricant oil, cool liquid, lubricant oil . . . . Creating the above configuration allows efficient heat exchange between the cool water and the lubricant oil.

In the present embodiment, the cool liquid for the lubricant oil cooler 32 is fresh water, but if fresh water is used as the first cool liquid, the cool liquid for the lubricant oil cooler 32 may be a second cool liquid, such as seawater, which is different from the first cool liquid.

The multi-plate heat exchange units 311 and 321, depending on the required cooling capacity, can adjust the size of a single plate vertically and horizontally, or the number of plates. Due to this, creating the configurations of the cool liquid cooler 31 and the lubricant oil cooler 32 each provided with the multi-plate heat exchange unit makes it easy to so place the cool liquid cooler 31 and the lubricant oil cooler 32 as to be arranged on the same face. Further, the heat exchange units 311 and 321 each may have a configuration other than the multi-plate type, such as a multi-pipe type, for example. Further, the heat exchange unit 311 of the cool liquid cooler 31 and the heat exchange unit 321 of the lubricant oil cooler 32 may be configured by methods different from each other.

4. Notes, Etc.

The various technical features disclosed in the present specification can be modified in various ways without departing from the gist of the technical creation thereof. That is, the above embodiments should be considered exemplary in all respects and not restrictive. Further, the multiple embodiments and modified examples shown in the present specification may be combined to the extent possible.

In the above embodiments, the engine 100 is the V-type engine, but this is merely an exemplification. The present invention can be applied, for example, to an in-line engine in which the pistons reciprocate in the up and down direction and a horizontally opposed engine in which the pistons reciprocate in the horizontal direction. The present invention is preferable for the engine provided with a plurality of cylinder rows whose rows extend in the crankshaft direction.

REFERENCE SIGNS LIST

1: cylinder block (engine block)
4: head block (engine block)
6: crankshaft
22: exhaust manifold
23: turbocharger
28: cool liquid collection pipe
28R: right cool liquid collection pipe (first cool liquid collection pipe)
28L: left cool liquid collection pipe (second cool liquid collection pipe)
29: exhaust communication pipe
30: cool liquid pump
31: cool liquid cooler (cool liquid flow channel component)
32: lubricant oil cooler
33: thermostat cover
34: thermostat case (cool liquid flow channel component)
40: gear case
50: cool liquid flow channel
50R: first cool liquid flow channel
50L: second cool liquid flow channel
52: shared cool liquid flow channel
100: engine
111R: right cylinder row
111L: left cylinder row
311: heat exchange unit of cool liquid cooler
321: heat exchange unit of lubricant oil cooler
407R: right cylinder row-dedicated first intra-case flow channel (intra-case flow channel, first flow channel)
407L: left cylinder row-dedicated first intra-case flow channel (intra-case flow channel, first flow channel)
408: bulkhead
411: shared intra-case flow channel (intra-case flow channel, second flow channel)

The invention claimed is:

1. An engine comprising:

a cool liquid cooler configured to cool a first cool liquid, the first cool liquid configured to cool an engine block including a cylinder block and a head block;

a lubricant oil cooler configured to cool a lubricant oil using the first cool liquid or a second cool liquid, two cylinder rows; and a gear case placed between the engine block and the cool liquid cooler and/or the lubricant oil cooler, wherein the gear case has a bulkhead;

wherein the cool liquid cooler and the lubricant oil cooler are so placed as to be arranged side by side on one end side in a crankshaft direction;

wherein the cool liquid cooler and/or the lubricant oil cooler is mounted to the gear case, wherein the gear case has an intra-case cool liquid flow channel through which the first cool liquid is configured to pass, wherein the intra-case cool liquid flow channel includes a first flow channel placed upstream of the cool liquid cooler and a second flow channel placed downstream of the cool liquid cooler, wherein the bulkhead partitions the first cool liquid flow channel from the second cool liquid flow channel, wherein the first cool liquid flow channel provides cooling for one of the two cylinder rows, and the second cool liquid flow channel provides cooling for another of the two cylinder rows.

2. The engine as claimed in claim 1, wherein at least one of the cool liquid cooler and the lubricant oil cooler includes a multi-plate heat exchange unit.

3. The engine as claimed in claim 1, where the two cylinder rows are so placed as to be arranged side by side and extending in the crankshaft direction.

4. The engine as claimed in claim 1, wherein:

the engine is a liquid-cooled engine, the engine including:

the engine block including the cylinder block and the head block, an exhaust manifold mounted to the engine block, a turbocharger configured to be driven by exhaust gas from the exhaust manifold, an exhaust communication pipe configured to provide communication between the exhaust manifold and the turbocharger, and a cool liquid flow channel through which a cool liquid discharged from the engine block is configured to flow in an order of the exhaust communication pipe and the exhaust manifold.

5. The engine as claimed in claim 4, wherein the cool liquid flow channel includes a cool liquid collection pipe configured to collect the cool liquid discharged from a plurality of places of the engine block and discharge the cool liquid to the exhaust communication pipe.

6. The engine as claimed in claim 5, wherein:

the exhaust manifold and the cool liquid collection pipe are placed parallel to a crankshaft, and at least a part of the turbocharger is placed more on one side in the crankshaft direction than the exhaust manifold.

7. The engine as claimed in claim 6, wherein at an end portion on another side in the crankshaft direction, a cool liquid flow channel component is placed to which the cool liquid flowing through the exhaust manifold is sent.

8. The engine as claimed in claim 7, wherein the cool liquid flow channel component includes at least one of a thermostat case that encases a thermostat and the cool liquid cooler.

9. The engine as claimed in claim 1, wherein:

the first cool liquid flow channel includes a first cool liquid collection pipe configured to collect a cool liquid having cooled one of the two cylinder rows, and the second cool liquid flow channel includes a second cool liquid collection pipe configured to collect a cool liquid having cooled another of the two cylinder rows.

10. The engine as claimed in claim 9, wherein the cool liquid entering the gear case from the first cool liquid collection pipe and/or the second cool liquid collection pipe is discharged to a thermostat case which cases the thermostat.

11. The engine as claimed in claim 1, wherein the gear case has a shared cool liquid flow channel that is shared by both the first cool liquid flow channel and the second cool liquid flow channel.

12. The engine as claimed in claim 11, wherein the shared cool liquid flow channel includes a flow channel that leads a cool liquid, which is discharged from the lubricant oil cooler that cools the lubricant oil, to the cool liquid pump.

13. The engine as claimed in claim 1, wherein a part of the first cool liquid flow channel provided in the gear case includes a flow channel that leads a cool liquid, which is supplied from a cool liquid pump, to one of the two cylinder rows.

14. The engine as claimed in claim 1, wherein a part of the second cool liquid flow channel provided in the gear case includes a flow channel that leads a cool liquid, which is supplied from a cool liquid pump, to another of the two cylinder rows.

* * * * *